US012608912B2

(12) United States Patent
Chai et al.

(10) Patent No.: US 12,608,912 B2
(45) Date of Patent: Apr. 21, 2026

(54) DATA MINING USING GROUP CLASSIFIERS

(71) Applicant: NVIDIA Corporation, Santa Clara, CA (US)

(72) Inventors: Weiheng Chai, Santa Clara, CA (US); Anurag Singh, Santa Clara, CA (US); Yifang Xu, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 227 days.

(21) Appl. No.: 18/456,984

(22) Filed: Aug. 28, 2023

(65) Prior Publication Data

US 2025/0078458 A1     Mar. 6, 2025

(51) Int. Cl.
G06V 10/764       (2022.01)
G06V 10/44        (2022.01)
G06V 10/774       (2022.01)
G06V 10/776       (2022.01)
G06V 10/778       (2022.01)
(Continued)

(52) U.S. Cl.
CPC ............ G06V 10/764 (2022.01); G06V 10/44 (2022.01); G06V 10/774 (2022.01); G06V 10/776 (2022.01); G06V 10/7788 (2022.01); G06V 20/41 (2022.01); G06V 20/582 (2022.01)

(58) Field of Classification Search
CPC .... G06V 10/764; G06V 10/44; G06V 10/774; G06V 10/776; G06V 10/7788; G06V 20/41; G06V 20/582
See application file for complete search history.

(56) References Cited

U.S. PATENT DOCUMENTS 10,928,830 B1 *   2/2021   Tran ........................ G06V 10/82
11,100,643 B2    8/2021   Yang et al.
11,182,649 B2   11/2021   Tremblay et al.
(Continued)

OTHER PUBLICATIONS

"Hiroki Nomiya et. al., Multistrategical Image Classification for Image Data Mining, Aug. 2007, MDM /07: Proceedings of the 8th international workshop on Multimedia datamining: associated with the ACM SIGKDD" (Year: 2007).*
(Continued)

*Primary Examiner* — Chineyere Wills-Burns
*Assistant Examiner* — Phuong Hau Cai
(74) *Attorney, Agent, or Firm* — IRON SUMMIT IP LLP

(57)                ABSTRACT

In various examples, data mining using group classifiers for autonomous and semi-autonomous systems and applications is described. For instance, systems and methods may train and use a classifier that is configured to determine whether data samples (e.g., images) represent objects associated with a group in various training and/or mining iterations. For instance, after each iteration, the classifier may become more accurate such that the classifier is able to better identify first data samples that are associated with the group (e.g., positive images) and/or second data samples that are not associated with the group (e.g., negative images). Additionally, the systems and methods may use another classifier to determine classifications associated with objects represented by at least the first data samples that are associated with the group. The systems and method may then store these first data samples and the classifications in one or more databases.

20 Claims, 17 Drawing Sheets

(51) Int. Cl.
 *G06V 20/40* (2022.01)
 *G06V 20/58* (2022.01)

(56) References Cited

U.S. PATENT DOCUMENTS

| | | | |
|---|---|---|---|
| 11,250,296 B2 | 2/2022 | Brower | |
| 11,429,809 B2 * | 8/2022 | Ge | G06N 3/0895 |
| 2021/0142177 A1 | 5/2021 | Mallya et al. | |
| 2023/0017261 A1 | 1/2023 | Firner | |

OTHER PUBLICATIONS

"Luis Perez et. al., the Effectiveness of Data Augmentation in Image Classification using Deep Learning, Dec. 2017, Computer Vision and Pattern Recognition, arXiv: 17412.04621" (Year: 2017).*

"William Saunders et. al., Trial without Error: Towards Safe Reinforcement Learning via Human Intervention, Jul. 2017, Artificial Intelligence; Machine Learning; Neural and Evolutionary Computing" (Year: 2017).*

"Andrej Karpathy et. al., Large-Scale Video Classification with Convolutional Neural Networks, 2014, Proceedings of the IEEE Conference on Computer Vision and Pattern Recognition CVPRR, pp. 1725-1732" (Year: 2014).*

"Yu-Gang Jiang et. al., Exploiting Feature and Class Relationships in Video Categorization with Regularized Deep Neural Networks, Feb. 2017, IEEE Transactions on Pattern Analysis and Machine Intelligence, vol. 40, Issue 2" (Year: 2017).*

* cited by examiner

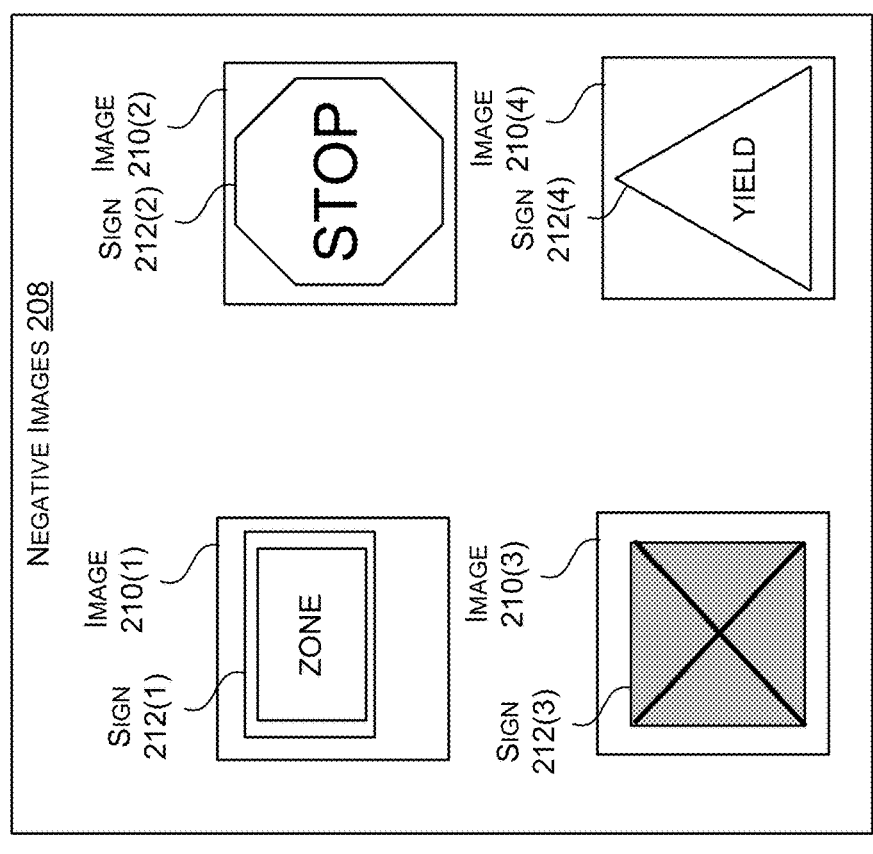
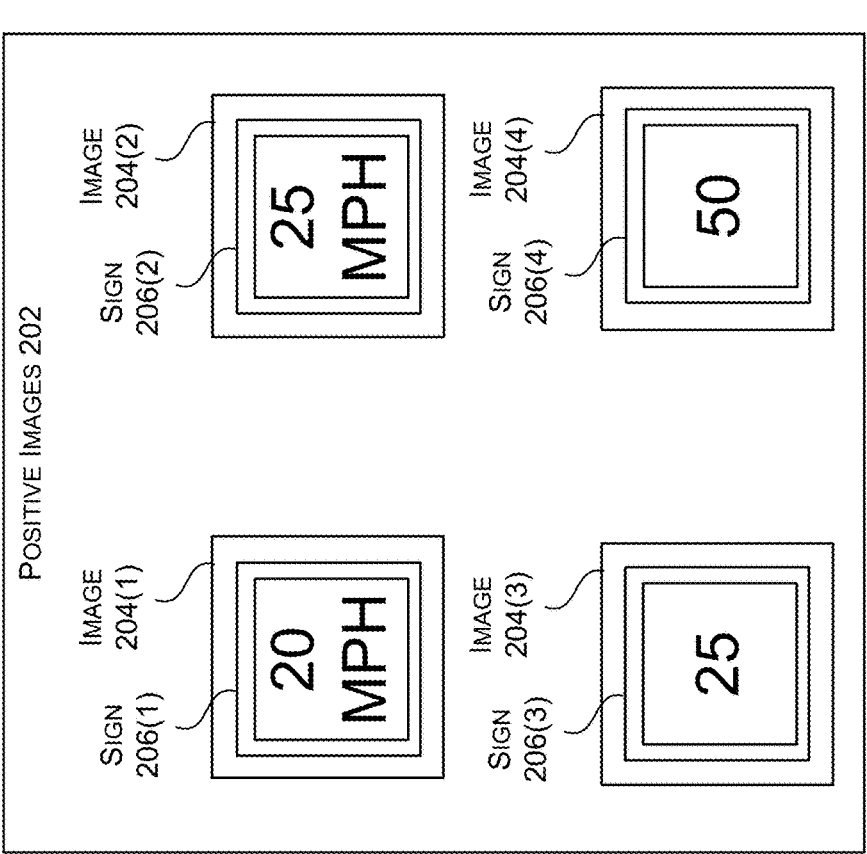
FIGURE 2

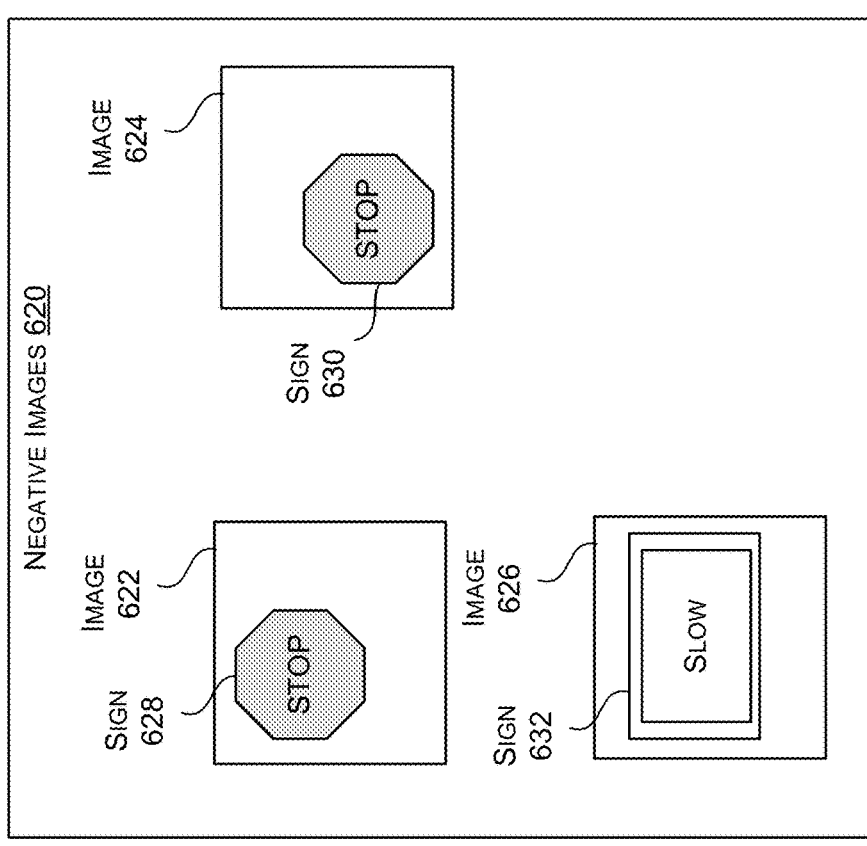
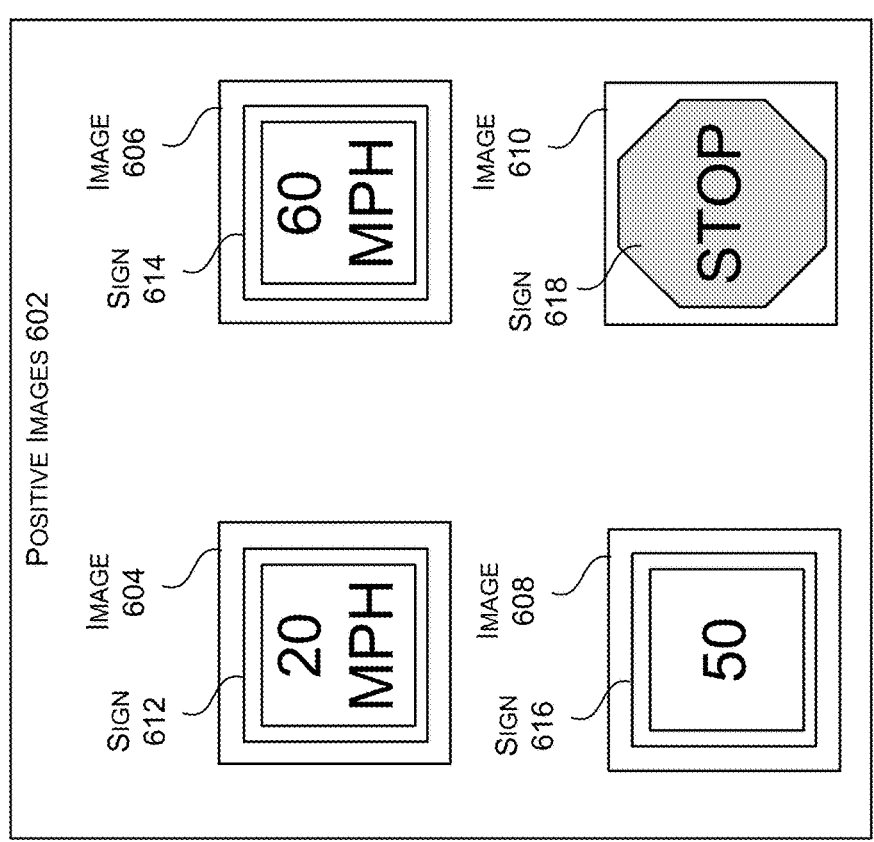
FIGURE 6A

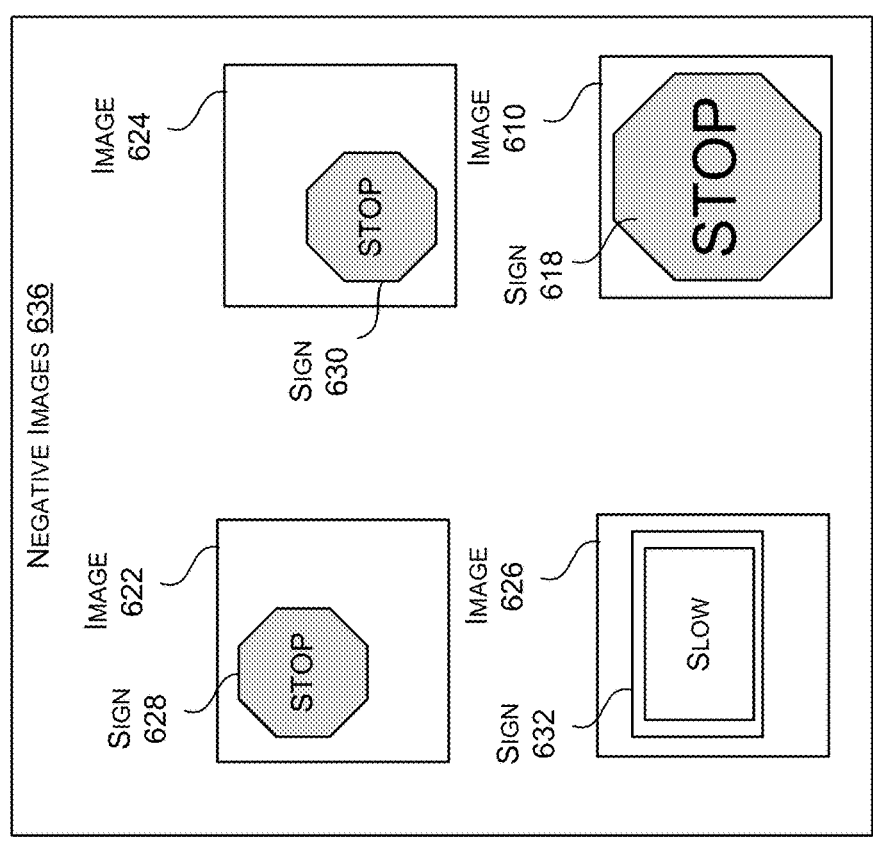
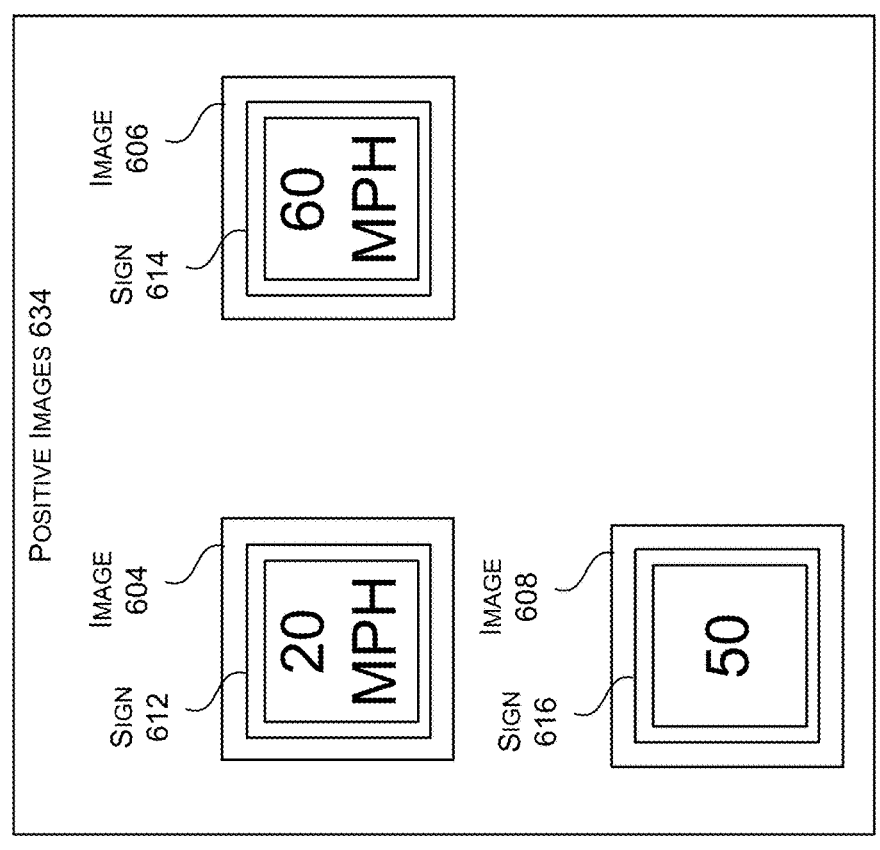
FIGURE 6B

900

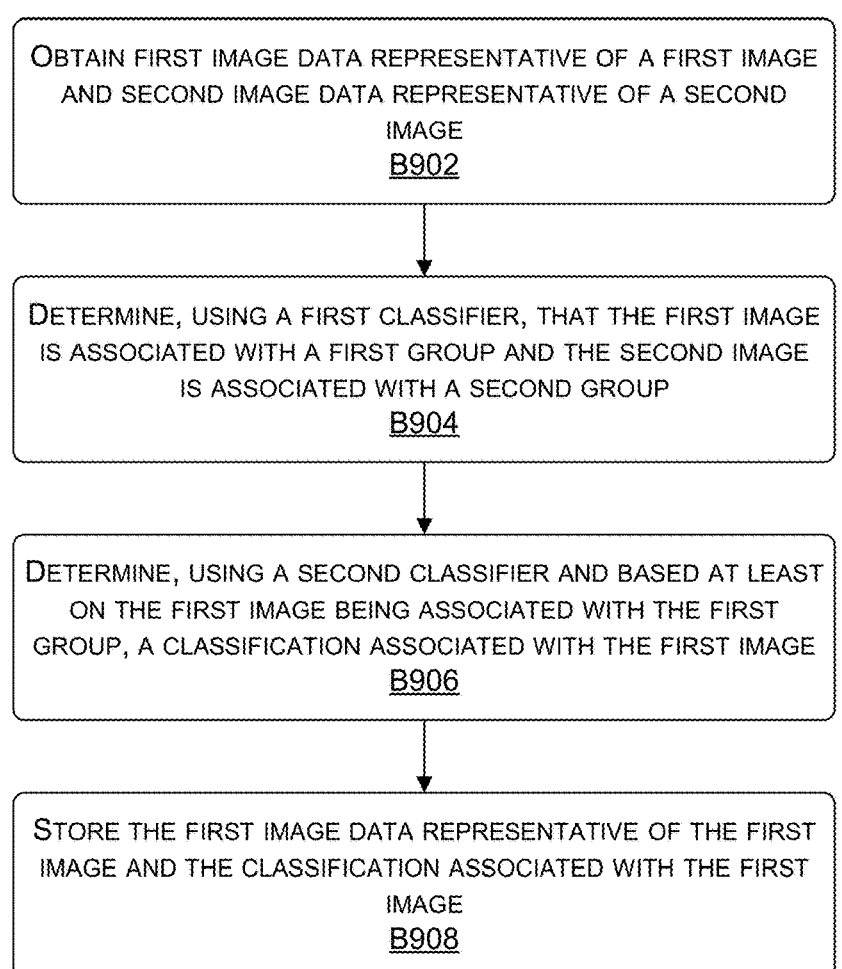

OBTAIN FIRST IMAGE DATA REPRESENTATIVE OF A FIRST IMAGE AND SECOND IMAGE DATA REPRESENTATIVE OF A SECOND IMAGE
B902

DETERMINE, USING A FIRST CLASSIFIER, THAT THE FIRST IMAGE IS ASSOCIATED WITH A FIRST GROUP AND THE SECOND IMAGE IS ASSOCIATED WITH A SECOND GROUP
B904

DETERMINE, USING A SECOND CLASSIFIER AND BASED AT LEAST ON THE FIRST IMAGE BEING ASSOCIATED WITH THE FIRST GROUP, A CLASSIFICATION ASSOCIATED WITH THE FIRST IMAGE
B906

STORE THE FIRST IMAGE DATA REPRESENTATIVE OF THE FIRST IMAGE AND THE CLASSIFICATION ASSOCIATED WITH THE FIRST IMAGE
B908

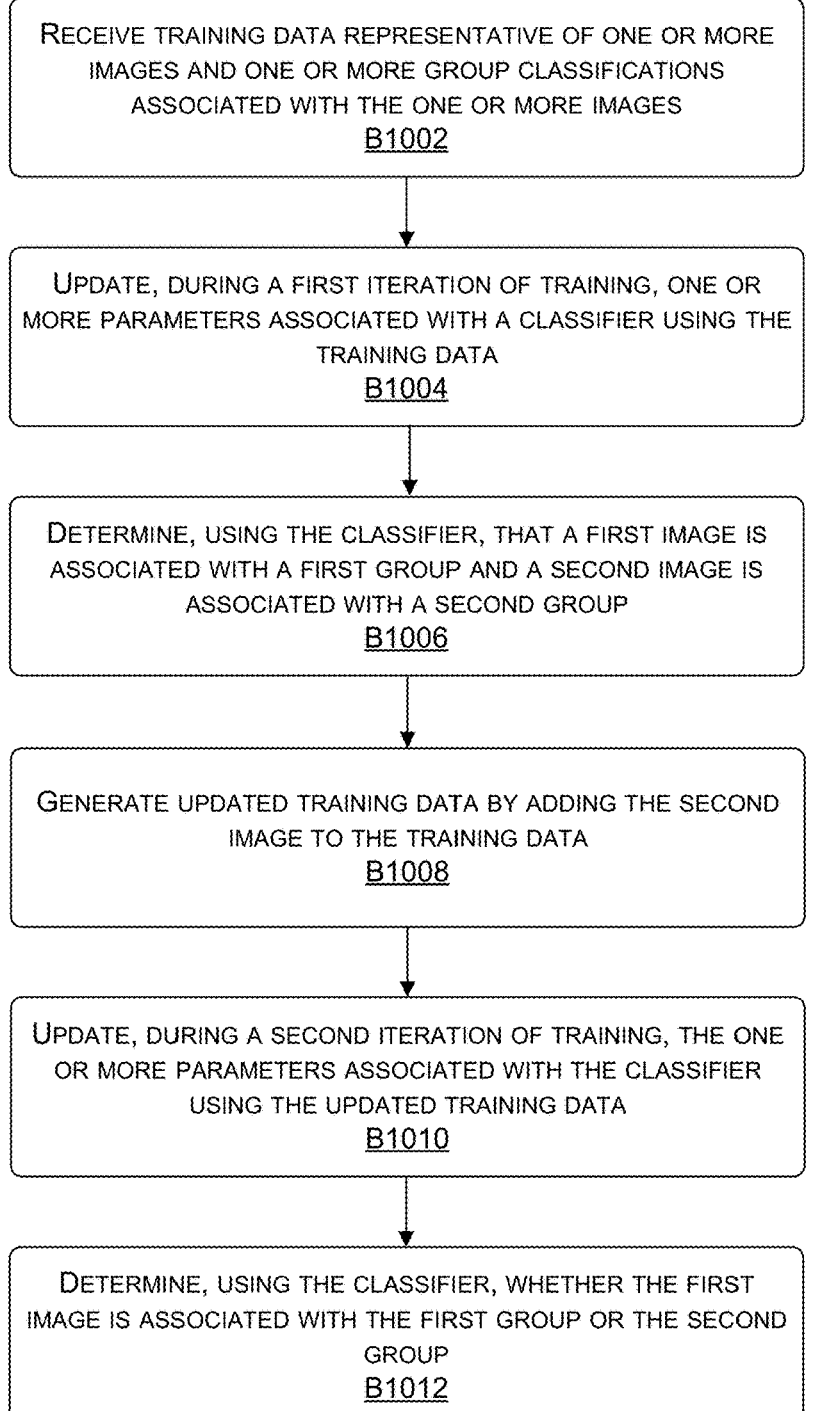

RECEIVE TRAINING DATA REPRESENTATIVE OF ONE OR MORE
IMAGES AND ONE OR MORE GROUP CLASSIFICATIONS
ASSOCIATED WITH THE ONE OR MORE IMAGES
B1002

UPDATE, DURING A FIRST ITERATION OF TRAINING, ONE OR
MORE PARAMETERS ASSOCIATED WITH A CLASSIFIER USING THE
TRAINING DATA
B1004

DETERMINE, USING THE CLASSIFIER, THAT A FIRST IMAGE IS
ASSOCIATED WITH A FIRST GROUP AND A SECOND IMAGE IS
ASSOCIATED WITH A SECOND GROUP
B1006

GENERATE UPDATED TRAINING DATA BY ADDING THE SECOND
IMAGE TO THE TRAINING DATA
B1008

UPDATE, DURING A SECOND ITERATION OF TRAINING, THE ONE
OR MORE PARAMETERS ASSOCIATED WITH THE CLASSIFIER
USING THE UPDATED TRAINING DATA
B1010

DETERMINE, USING THE CLASSIFIER, WHETHER THE FIRST
IMAGE IS ASSOCIATED WITH THE FIRST GROUP OR THE SECOND
GROUP
B1012

FIGURE 10

STEREO CAMERA 1168

MID-RANGE CAMERA, WING MIRROR MOUNT 1198

SURROUND CAMERA 1174

MID-RANGE CAMERA, WING MIRROR MOUNT 1198

SURROUND CAMERA(S) 1174

SURROUND CAMERA(S) 1174

1100

INFRARED CAMERA 1172

WIDE VIEW CAMERA 1170

LONG-RANGE CAMERA 1198

LONG-RANGE CAMERA 1198

STEREO CAMERA 1168

SERVER(S) 1178

CPU 1180(B)

CPU 1180(A)

PCIe SWITCH 1182(D)

PCIe SWITCH 1182(C)

PCIe SWITCH 1182(B)

PCIe SWITCH 1182(A)

GPU 1184(F)

GPU 1184(H)

GPU 1184(E)

GPU 1184(G)

GPU 1184(B)

GPU 1184(D)

GPU 1184(A)

GPU 1184(C)

1186

1188

1100

1194

1192

NETWORK(S) 1190

1176

1300

DATA MINING USING GROUP CLASSIFIERS

BACKGROUND

Data mining is important for many applications, such as to generate training data for neural networks, retrieve specific data samples for human analysis, and/or the like. Some typical systems that perform data mining use a human to review data samples in order to provide annotations describing content associated with the data samples. For example, when a system is performing data mining to generate training data for training neural networks to detect street signs, a human may review images captured by vehicles while the vehicles were navigating around environments. Based on the review, the human may determine sign classifications (e.g., stop signs, speed limit signs, crosswalk signs, etc.) associated with the signs depicted by the images and provide annotations for the images that identify locations of the signs (e.g., using bounding shapes) and that describe the sign classifications (e.g., stop sign, yield sign, construction sign, etc.). These images, along with the annotations, may then be used as the training data for the neural networks.

Other typical systems that perform data mining use machine learning in order to provide content associated with data samples. For example, a machine learning model may be trained to identify a specific type of object, such as a specific type of street sign (e.g., a stop sign), using training images of the specific type of object that is annotated. The machine learning model may then be used to mine unlabeled images in order to identify images that also depict the specific type of object. However, such machine learning models may be unable to identify objects for which the machine learning models were not trained. For example, if a machine learning model is trained to identify a specific type of stop sign, such as a red stop sign, then the machine learning model may not identify a different type of stop sign for which the machine learning model was not specifically trained, such as a yellow stop sign. Additionally, such machine learning models may not remove a large number of images that are irrelevant, such as images that depict other types of objects that are irrelevant to the search. As such, one or more humans may again need to review the results in order to confirm that the results are accurate. As such, existing solutions to data mining are time consuming and require an extensive amount of human involvement and oversight.

SUMMARY

Embodiments of the present disclosure relate to data mining using group classifiers for autonomous and semi-autonomous systems and applications. For instance, systems and methods may train and use a classifier that is configured to determine whether data samples (e.g., images) represent objects associated with a group in various training and/or mining iterations. For instance, during a first iteration, the classifier may be trained using training data samples that represent objects along with indications (e.g., labels, annotations, etc.) indicating whether the objects are included in a group or not included in the group. The classifier may then be used to mine through unlabeled data samples representing objects to determine whether those objects are associated with the group or not associated with the group. Next, during a second iteration, the classifier may be trained using the training data samples as well as the data samples that the classifier determined were not associated with the group.

The classifier may then again be used to mine through the unlabeled data samples that were initially selected for the group to determine whether those objects are still associated with the group. This process may repeat for any number of iterations, where the classifier gets more accurate in selecting images that represent objects included in the group with each iteration. In some examples, such as after the last iteration, another classifier may be used to determine classifications associated with the objects represented in the selected data samples.

In contrast to conventional systems, such as those described above that use human annotation, the current systems, in some embodiments, may automatically filter the data samples in order to remove data samples that are not important (e.g., included in groups other than the relevant group) and/or identify data samples that are of high importance (e.g., included in the relevant group). As described herein, the current systems are able to perform such filtering using the classifier that is trained, using one or more iterations, for identifying data samples associated with the relevant group. Additionally, in contrast to conventional systems, the current systems, in some embodiments, may automatically generate labels (e.g., annotations, etc.) for at least a portion of the selected data samples without human interaction.

Furthermore, in contrast to conventional systems, such as those described above that use machine learning models, the current systems, in some embodiments, are able to identify data samples that represent objects for which no and/or little training data is available. In some examples, the current systems are able to identify such data samples by being trained to identify objects associated with a group, such as a group that includes common features (e.g., shapes, sizes, colors, content, etc.), instead of being trained to identify specific objects. Moreover, in contrast to such conventional systems, the current systems, in some embodiments, may better filter data samples in order to identify relevant data samples for which the mining is configured to identify and/or remove data samples that are not relevant. In some examples, the current systems are able to better filter the data samples by training and/or executing the classifier using multiple iterations, where the performance of the classifier may improve with one or more (e.g., each) iteration.

BRIEF DESCRIPTION OF THE DRAWINGS

The present systems and methods for data mining using group classifiers for autonomous and semi-autonomous systems and applications are described in detail below with reference to the attached drawing figures, wherein:

FIG. 2 illustrates an example of training data that may be used to train a classifier, in accordance with some embodiments of the present disclosure;

FIG. 6A illustrates first results associated with a first iteration of mining using a classifier, in accordance with some embodiments of the present disclosure;

FIG. 6B illustrates second results associated with a second iteration of mining using the classifier from the example of FIG. 6A, in accordance with some embodiments of the present disclosure;

FIG. 9 illustrates a flow diagram showing a method for performing data mining using a group classifier, in accordance with some embodiments of the present disclosure;

FIG. 10 illustrates a flow diagram showing a method for performing iterations associated with data mining, in accordance with some embodiments of the present disclosure;

DETAILED DESCRIPTION

Figure 1:
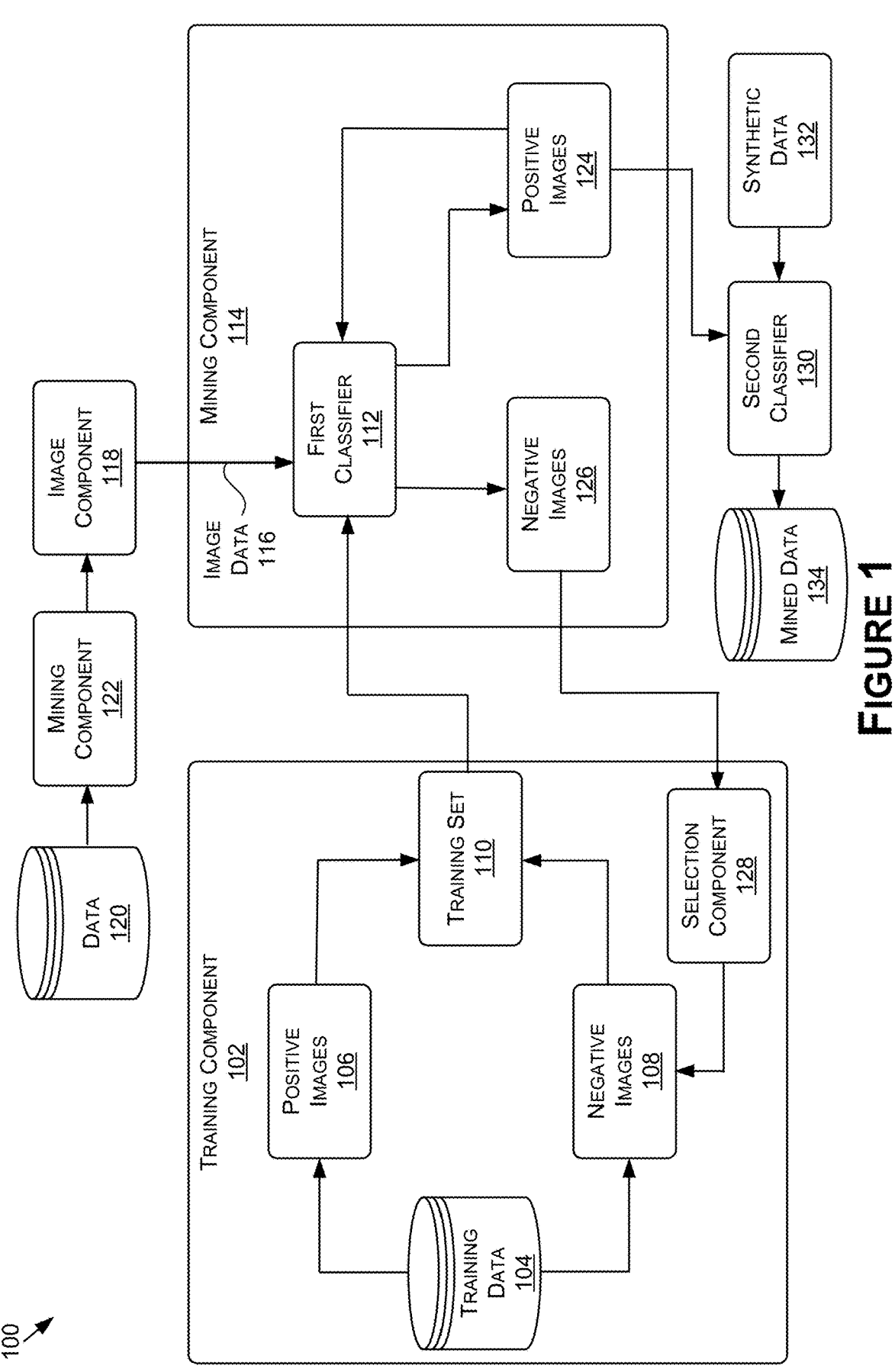
FIG. 1 illustrates an example data flow diagram for a process of performing data mining using a classifier that is trained to identify a group of objects, in accordance with some embodiments of the present disclosure.

Systems and methods are disclosed related to data mining using group classifiers for autonomous and semi-autonomous systems and applications. Although the present disclosure may be described with respect to an example autonomous or semi-autonomous vehicle or machine 1100 (alternatively referred to herein as "vehicle 1100," "ego-vehicle 1100," "machine 1100," or "ego-machine 1100," an example of which is described with respect to FIGS. 11A-11D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to data mining, this is not intended to be limiting, and the systems and methods described herein may be used in augmented reality, virtual reality, mixed reality, robotics, security and surveillance, autonomous or semi-autonomous machine applications, and/or any other technology spaces where data mining may be used.

For instance, a system(s) may train a first classifier, such as one or more first machine learning models and/or one or more first neural networks, to identify images that depict objects associated with a first group. As described herein, an object may include, but is not limited to, a street sign, a vehicle, a pedestrian, a road marking, a structure, an animate or dynamic actor, a static object, and/or any other type of object. Additionally, the first group may be associated with objects that share one or more common features with one another. As described herein, a feature may include, but is not limited to, a shape (e.g., circle, triangle, square, rectangle, pentagon, octagon, etc.), a color (e.g., white, black, yellow, red, orange, etc.), content (e.g., text, graphics, symbols, etc.), a size, and/or any other type of feature. For example, if the first group is associated with objects that include speed limit signs, then the features may include rectangular in shape, white in color, and content that includes numbers. For a second example, if the first group is associated with objects that include construction signs, then the features may include orange in color and content that includes one or more words (e.g., construction, work, zone, etc.) associated with construction.

The first classifier may initially be trained using training data. As described herein, the training data may include images depicting objects and indications (e.g., annotations, labels, etc.) indicating whether the images (e.g., the objects depicted by the images) are associated with the first group (e.g., positive images) or a second group (e.g., negative images). In some examples, the second group may be associated with objects other than the objects that are associated with the first group. For a first example, if the first group is again associated with objects that include speed limit signs, then the second group may be associated with objects other than speed limit signs (e.g., street signs that do not include speed limit signs). For a second example, if the first group is again associated with objects that include construction signs, then the second group may be associated with objects other than construction signs (e.g., street signs that do not include construction signs). As such, and as described in more detail herein, the system(s) may train, during a first iteration of training, the first classifier using the training data.

After the first iteration of training, the system(s) may then use the first classifier to filter image data representing images depicting objects. In some examples, the image data may include unlabeled image data such that the classifications associated with the objects depicted by the images are unknown. To filter an image represented by the image data, the first classifier may process the image data representing the image and, based at least on the processing, output data indicating a group classification associated with the image. As described herein, the group classification may indicate whether the image is associated with the first group (e.g., a positive image) or associated with the second group (e.g., a negative image). Additionally, in some examples, the first classifier may output additional information associated with the image, such as a first probability that the first image is associated with the first group and/or a second probability that the image is associated with the second group. The first classifier may then perform similar processes to output information associated with one or more (e.g., each) of the other images. As such, after the processing, the system(s)

may identify first images that are associated with the first group and second images that are associated with the second group.

As described herein, such as to improve the performance of the mining, the system(s) may repeat these processes using one or more additional iterations. For instance, the system(s) may add one or more of the second images (e.g., each of the second images) associated with the second group to the training data. This way, the training data may include one or more additional examples of one or more images that are associated with the second group, where the additional image(s) also includes one or more indications that the additional image(s) is associated with the second group. The system(s) may then use the updated training data to again train the first classifier during a second iteration of training. By including the additional image(s) within the updated training data, the updated training of the first classifier may improve the performance of the first classifier for identifying images that are associated with the first group.

For example, after the second iteration of training, the system(s) may again use the first classifier to filter the image data representing the images depicting the objects and/or just filter the image data representing the first images for which the first classifier initially associated with the first group. Based at least on the filtering, the first classifier may determine third images that are associated with the first group and/or fourth images that are associated with the second group. In some examples, since the first classifier was further trained using the updated training data, the third images that are associated with the first group may include less images than the first images that were originally associated with the first group. This is because, as described herein, the first classifier was better trained to identify the images associated with the first group and/or filter out the images not associated with the first group.

For example, if the first classifier is trained to identify images that depict objects that include speed limit signs, after the first iteration of training, the first classifier may determine that a first image that depicts a stop sign is associated with the first group and a second image that also depicts a stop sign is associated with the second group. As such, during the second iteration of training, by including the second image in the training data, the first classifier may be updated such that the first classifier is better at determining that stop signs are not associated with the first group. Because of this, after the second iteration of training, the first classifier may determine that both the first image and the second image are associated with the second group. In other words, the first classifier may better filter out images that are not associated with street signs.

In some examples, the system(s) may continue to perform these processes using one or more additional iterations of training in order to continue improving the performance of the first classifier and/or further filter the images between the first group and the second group. In some examples, the system(s) may continue to perform these processes until the occurrence of one or more events. For a first example, the system(s) may continue to perform these processes until a key performance indicator (KPI) associated with the first classifier satisfies (e.g., is equal to or greater than) a threshold performance level. The threshold performance level may include, but is not limited to, 80%, 85%, 90%, 95%, 99%, and/or any other percentage level. For a second example, the system(s) may continue to perform these processes until the system(s) performs a set number of iterations of training. The set number of iterations of training may include, but is not limited to, one iteration, two iterations, five iterations, ten iterations, and/or any other number of iterations. While these are just two example events that may cause the processes to end, in other examples, the processes may end based on the occurrence of one or more additional and/or alternative events.

In some examples, the system(s) may then use a second classifier, such as one or more second machine learning models and/or one or more second neural networks, to determine object classifications associated with the images that are associated with the first group. As described herein, an object classification may include, but is not limited to, street sign, vehicle, pedestrian, road marking, structure, animate actor, static object, and/or any other classification. Additionally, in some examples, the object classification may be more specific. For a first example, if the images depict objects that include street signs, then the object classification may include speed limit sign, stop sign, yield sign, construction sign, crosswalk sign, and/or the like. For a second example, if the images depict objects that include speed limit signs, then the object classification may include 25 miles per hour (MPH) speed limit sign, 50 MPH speed limit sign, 60 MPH speed limit sign, 75 MPH speed limit sign, and/or the like.

In some examples, the system(s) may perform one or more additional processes to determine whether additional processing needs to be performed for classifying the images. For example, and for an image, the system(s) may process the image data representing the image in order to generate additional image data representing one or more augmented images depicting the object. The system(s) may then process the image data and the additional image data using the second classifier in order to determine object classifications associated with the images. The system(s) may then determine whether further processing should be performed on the image, such as human analysis, based at least on the classifications. For example, the system(s) may determine that no additional processing needs to be performed based on a threshold number of the classifications and/or a threshold percentage of the classifications being similar (e.g., the same). As described herein, the threshold number may include, but is not limited to, two classifications, five classifications, ten classifications, and/or any other number of classifications. Additionally, the threshold percentage of classifications may include, but is not limited to, 75%, 80%, 90%, 95%, 99%, and/or any other percentage of classifications.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, generative AI applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems implementing one or more language models-such as one or more large language models (LLMs), systems for performing synthetic data generation operations, systems for performing one or more generative AI operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 illustrates an example data flow diagram for a process 100 of performing data mining using a classifier that is trained to identify a group of objects, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1100 of FIGS. 11A-11D, example computing device 1200 of FIG. 12, and/or example data center 1300 of FIG. 13.

The process 100 may include a training component 102 retrieving, receiving, obtaining, generating, and/or determining training data from a training data database 104. As described herein, in some examples, the training data may include image data representing images depicting objects and/or one or more specific types of objects, such as street signs. However, in other examples, the training data may include other types of data, such as video data, LIDAR data, RADAR data, audio data, and/or any other type of data for which data mining may be performed. Additionally, the training data may include positive images 106 that are associated with a first group of objects and negative images 108 that are associated with a second group of objects. As described herein, the first group may be associated with objects that share one or more common features with one another. A feature may include, but is not limited to, a shape (e.g., circle, triangle, square, rectangle, pentagon, octagon, etc.), a color (e.g., white, black, yellow, red, orange, etc.), content (e.g., text, graphics, symbols, etc.), a size, and/or any other type of feature. Additionally, the second group may be associated with objects that are not included in the first group.

For instance, FIG. 2 illustrates an example of training data that may be used to train a classifier, in accordance with some embodiments of the present disclosure. As shown by the example of FIG. 2, positive images 202 (which may represent, and/or include, the positive images 106), which may be associated with a first group, may include images 204(1)-(4) (also referred to singularly as "image 204" or in plural as "images 204") that depict speed limit signs 206(1)-(4) (also referred to singularly as "sign 206" or in plural as "signs 206"). Additionally, negative images 208 (which may represent, and/or include, the negative images 108), which may be associated with a second group, may include images 210(1)-(4) (also referred to singularly as "image 210" or in plural as "images 210") that depict other types of street signs 212(1)-(4) (also referred to as singularly as "sign 212" or in plural as "signs 212").

As further shown, the signs 206 associated with the positive images 202 may include one or more common features. For examples, the signs 206 may include a similar shape (e.g., square), a similar border, similar content (e.g., numbers), a similar color (e.g., white), and/or so forth. This may be because each of the signs 206 includes a similar type of sign, such as speed limit signs. However, the signs 212 included in the negative images 208 may not include one or more of the features. This may be because each of the signs 210 includes a different type of sign, such as a stop sign, a yield sign, and/or so forth. As such, a classifier may be trained using the training data to identify images depicting speed limit signs and/or images depicting one or more features associated with the speed limit signs.

Referring back to the example of FIG. 1, the process 100 may include the training component 102 generating a training set 110 that includes at least the positive images 106 and the negative images 108. The process 100 may then include the training component 102 training, during a first iteration of training, a first classifier 112 using the training set 110. As described herein, the first classifier 112, which may also be referred to as a "group classifier 112," may be trained using the training set 110 to (1) identify images depicting objects that are associated with the first group and/or images that depict one or more features of the objects associated with the first group and/or (2) identify images depicting objects that are not associated with the first group (e.g., objects that are associated with a second, different group) and/or images that depict one or more features that differ from the feature(s) of the objects associated with the first group. In some examples, the training component 102 trains the first classifier 112 by updating one or more parameters associated with the first classifier 112 using the training set 110.

Figure 3:
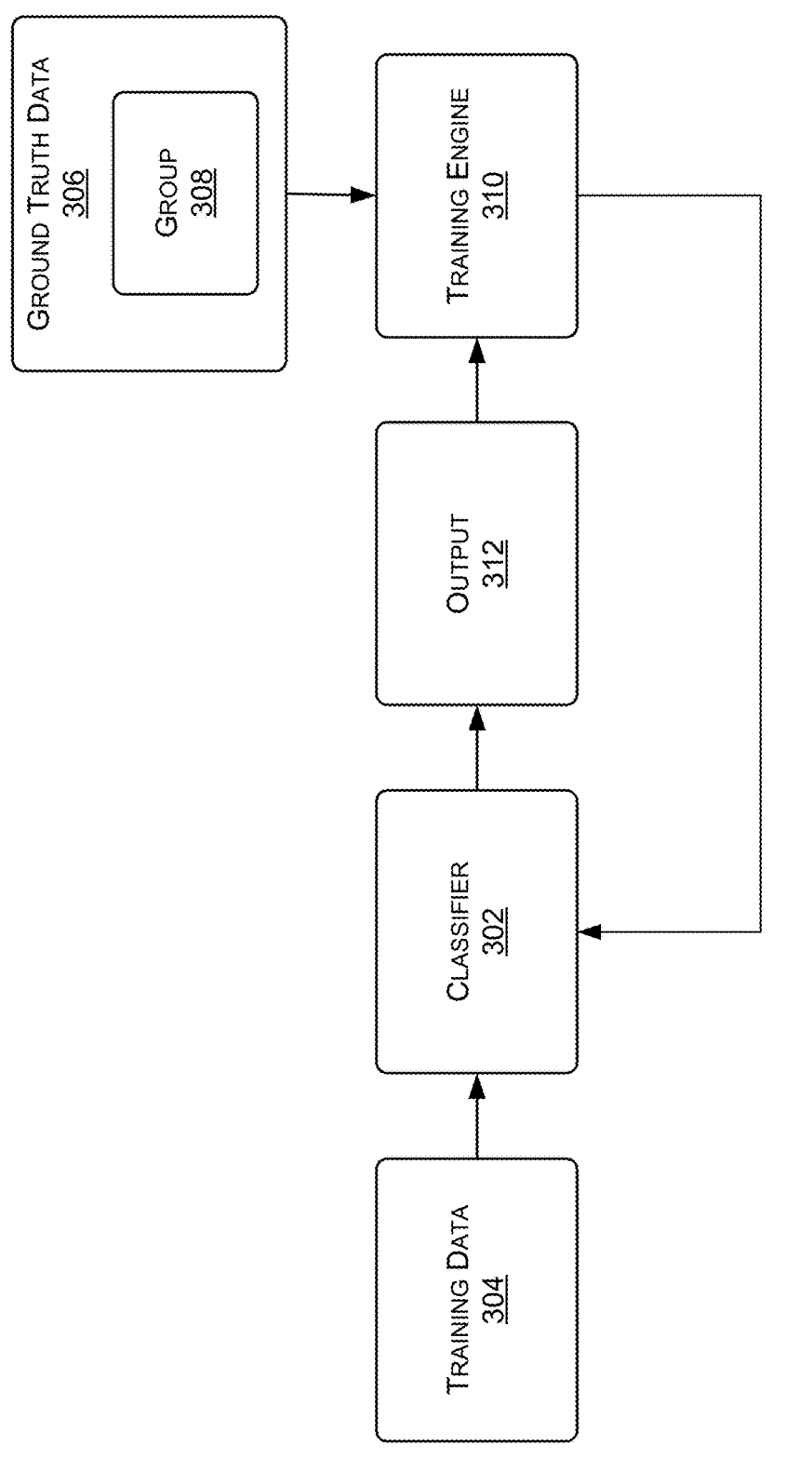
FIG. 3 illustrates a data flow diagram for a process for training a classifier to identify a group of objects, in accordance with some embodiments of the present disclosure.

For instance, FIG. 3 illustrates a data flow diagram for a process 300 for training a classifier 302 (which may represent, and/or include, the first classifier 112) to identify a group of objects, in accordance with some embodiments of the present disclosure. As shown, the classifier 302 may be trained using training data 304 (which may represent, and/or include, at least a portion of the training set 110). As described herein, in some examples, the training data 304 may represent one or more images depicting one or more objects. For example, if the classifier 302 is being trained to identify speed limit signs, then the training data 304 may represent at least the images 204 associated with the first group and/or the images 210 associated with the second group. However, in other examples, the training data 304 may include other types of data, such as LIDAR data, RADAR data, video data, audio data, and/or any other type of data.

The classifier 302 may be trained using the training data 304 as well as corresponding ground truth data 306. The ground truth data 306 may include indications, annotations, labels, masks, and/or the like. For instance, in some examples, the ground truth data 306 may include at least group 308 identifiers associated with the image(s) (whether an image is a positive image, such as associated with the first group, or a negative image, such as associated with the second group). The ground truth data 306 may be generated within a drawing program (e.g., an annotation program), a computer aided design (CAD) program, a labeling program, another type of program suitable for generating the ground truth data 306, and/or may be hand drawn, in some examples. In any example, the ground truth data 306 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies vertices of polylines, machine generates polygons using polygon rasterizer). In some examples, for each input image, there may be corresponding ground truth data 306 indicating the group 308 for which the image is associated.

A training engine 310 may use one or more loss functions that measure loss (e.g., error) in outputs 312 as compared to the ground truth data 306. As described herein, an output 312 for an image may indicate whether the image is a positive image and/or associated with the first group or a negative image and/or the second group. Any type of loss function may be used, such as cross entropy loss, mean squared error, mean absolute error, mean bias error, and/or other loss function types. In some examples, different outputs 312 may have different loss functions. In such examples, the loss functions may be combined to form a total loss, and the total loss may be used to train (e.g., update the parameters of) the classifier 302. In any example, backward pass computations may be performed to recursively compute gradients of the loss function(s) with respect to training parameters. In some examples, weights and biases of the classifier 302 may be used to compute these gradients.

Referring back to the example of FIG. 1, such as after the first iteration of training of the first classifier 112, the process 100 may include a mining component 114 using the first classifier 112 to mine data, such as image data 116 in the example of FIG. 1. In some examples, and as described herein, the image data 116 may represent images, such as unlabeled images, depicting various types of objects. For example, an image component 118, such as one or more machine learning models and/or one or more neural networks, may process data 120 that is stored in one or more databases. In some examples, the data 120 may include video data representing videos, image data representing images, and/or any other type of data. Based at least on the processing, the image component 118 may identify images depicting various objects and generate the image data 116 using the images. In some examples, the image component 118 may generate the image data 116 using one or more additional processes, such as by cropping the images to depict more of the objects than other portions of the images and/or generating bounding shapes (e.g., bounding boxes) indicating the locations of the objects within the images.

Figure 4:
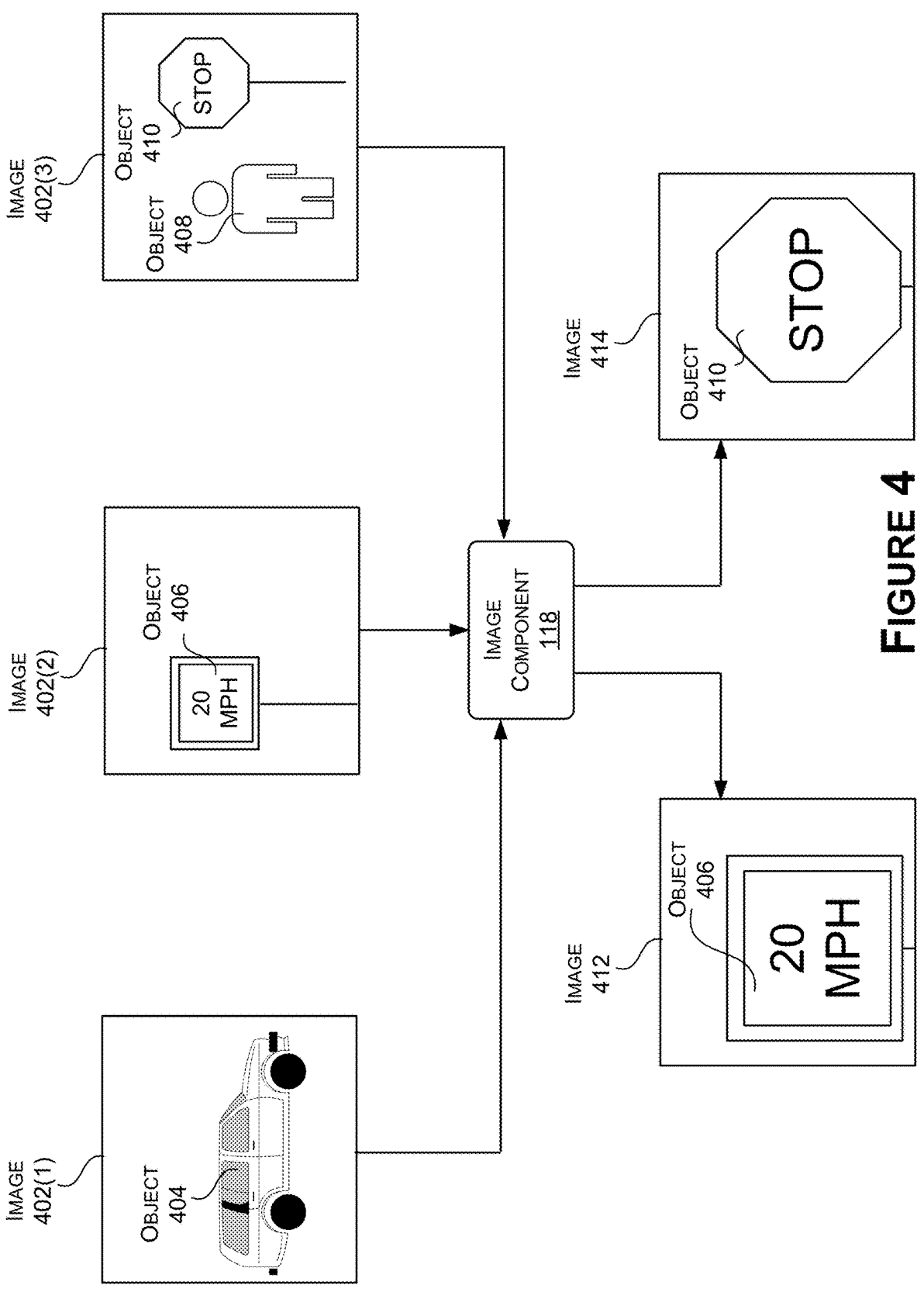
FIG. 4 illustrates an example of generating data to be mined by a classifier, in accordance with some embodiments of the present disclosure.

For instance, FIG. 4 illustrates an example of generating data to be mined by a classifier, in accordance with some embodiments of the present disclosure. In the example of FIG. 4, the image component 118 may process video data representing a video of an environment, where the video includes at least a first image 402(1), a second image 402(2), and a third image 402(3). Based at least on the processing, the image component 118 may determine that the first image 402(1) depicts a first object 404, such as a vehicle, the second image 402(2) depicts a second object 406, such as a street sign, and the third image 402(3) depicts a third object 408 and a fourth object 410, such as a pedestrian and a street sign, respectively. As such, the image component 118 may generate image data representing a specific type of object, such as street signs. For instance, and as further illustrated in the example of FIG. 4, the image component 118 may generate a fourth image 412, such as a cropped image, that depicts the second object 406 using the second image 402(2). The image component 118 may also generate a fifth image 414, such as another cropped image, that depicts the fourth object 410 using the third image 402(3).

Referring back to the example of FIG. 1, in some examples, a mining component 122 may use one or more processes to mine the data 120 that is then processed by the image component 118. For example, the data 120 may further represent embeddings for individual images and embeddings associated with text describing the individual images (e.g., text describing the objects depicted by the images). For a first example, if an image depicts a street sign, then the data may represent an embedding for the image and text describing that the image depicts the street sign. For a second example, if an image depicts a 50 MPH speed limit sign, then the data may represent an embedding for the image and text describing that the image depicts the 50 MPH speed limit sign. As such, the mining component 122 may receive, such as from one or more user devices, data representing text describing one or more types of objects for which to search. The mining component 122 may then use the text along with the embeddings to better identify the data 120 that is associated with (e.g., depicts) the objects for mining. For example, if a user wants to mine image data representing images depicting street signs, then the text may indicate "street signs." The mining component 122 may then use the text and the embeddings represented by the data 120 to identify one or more images that depict street signs. Additionally, the image component 118 may generate the image data 116 using identified image(s).

In some examples, the data 120 may represent actual data generated using one or more sensors. For example, the data 120 may represent image data generated using one or more image sensors of one or more vehicles when navigating one or more environments, where the image data depicts one or more images (e.g., one or more videos). Additionally, or alternatively, in some examples, the data 120 may include synthetic data. For example, such as if the actual data 120 does not represent a specific type of object, such as a specific type of speed limit sign, then synthetic data representing the specific type of object may be generated.

The process 100 may include the first classifier 112 processing the image data 116 and, based at least on the processing, identifying positive images 124 represented by the image data 116 and negative images 126 represented by the image data 116. As described herein, the positive images 124 may include a portion of the images that is associated with the first group of objects for which the first classifier 112 is trained to identify. Additionally, the negative images 126 may include a portion of the images that is associated with the second group of objects, where, in some examples, the second group of objects includes objects other than the first group of objects. However, during this first iteration, the first classifier 112 may wrongfully classify one or more images that are associated with the second group of objects as being part of the positive images 124.

Figure 5:
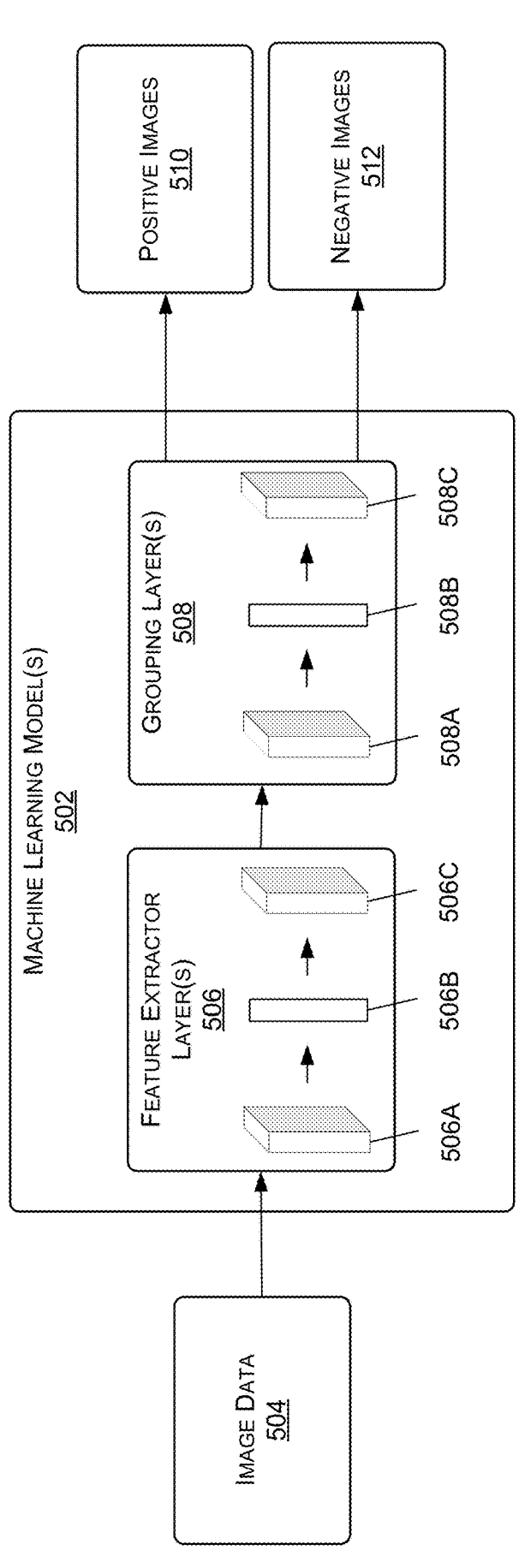
FIG. 5 illustrates an example of using one or more machine learning models to process image data in order to group the images, in accordance with some embodiments of the present disclosure.

For instance, FIG. 5 illustrates an example of one or more machine learning models 502 (which may represent, and/or include, the first classifier 112) processing image data 504 (which may represent, and/or include, the image data 116) in order to group images, in accordance with some embodiments of the present disclosure. The classifier 302 may include one or more neural networks that perform one or more of the processes described herein. In some examples, the neural network(s) may include or be referred to as a convolutional neural network and thus may alternatively be referred to herein as convolutional neural network, convolutional network, or CNN. In some examples, the neural network(s) may include any type of neural network that is capable of performing the processes described herein.

The machine learning model(s) 502 may use the image data 504 (with or without pre-processing) as an input. The image data 504 may represent one or more images depicting one or more objects. In some examples, the image data 504 may be input as a single image, or may be input using batching, such as mini-batching. For example, two or more images may be used as inputs together (e.g., at the same time).

The image data 504 may be input into one or more feature extractor layers 506 of the machine learning model(s) 502. The feature extractor layer(s) 506 may include any number of layers, such as the layers 506-506C. One or more of the layers 506 may include an input layer. The input layer may hold values associated with the image data 504. For example, when the image data 504 represents an image(s), the input layer may hold values representative of the raw pixel values of the image(s) as a volume (e.g., a width, W, a height, H, and color channels, C (e.g., RGB), such as 32.times.32.times.3), and/or a batch size, B (e.g., where batching is used).

One or more layers 506 may include convolutional layers. The convolutional layers may compute the output of neurons that are connected to local regions in an input layer (e.g., the input layer), each neuron computing a dot product between their weights and a small region they are connected to in the input volume. A result of a convolutional layer may be another volume, with one of the dimensions based on the number of filters applied (e.g., the width, the height, and the number of filters, such as 32×32×12, if 12 were the number of filters).

One or more of the layers 506 may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers 506 may include a pooling layer. The pooling layer may perform a down-sampling operation along the spatial dimensions (e.g., the height and the width), which may result in a smaller volume than the input of the pooling layer (e.g., 16×16×12 from the 32×32×12 input volume). In some examples, the machine learning model(s) 502 may not include any pooling layers. In such examples, other types of convolution layers may be used in place of pooling layers. In some examples, the feature extractor layer(s) 506 may include alternating convolutional layers and pooling layers.

One or more of the layers 506 may include a fully connected layer. Each neuron in the fully connected layer(s) may be connected to each of the neurons in the previous volume. The fully connected layer may compute class scores, and the resulting volume may be 1×1×N (where N is a number of classes). In some examples, the feature extractor layer(s) 506 may include a fully connected layer, while in other examples, the fully connected layer of the machine learning model(s) 502 may be the fully connected layer separate from the feature extractor layer(s) 506. In some examples, no fully connected layers may be used by the feature extractor layer(s) 506 and/or the machine learning model(s) 502 as a whole, in an effort to increase processing times and reduce computing resource requirements. In such examples, where no fully connected layers are used, the machine learning model(s) 502 may be referred to as a fully convolutional network.

One or more of the layers 506 may, in some examples, include deconvolutional layer(s). However, the use of the term deconvolutional may be misleading and is not intended to be limiting. For example, the deconvolutional layer(s) may alternatively be referred to as transposed convolutional layers or fractionally strided convolutional layers. The deconvolutional layer(s) may be used to perform up-sampling on the output of a prior layer. For example, the deconvolutional layer(s) may be used to up-sample to a spatial resolution that is equal to the spatial resolution of the input images to the machine learning model(s) 502, or used to up-sample to the input spatial resolution of a next layer.

Although input layers, convolutional layers, pooling layers, ReLU layers, deconvolutional layers, and fully connected layers are discussed herein with respect to the feature extractor layer(s) 506, this is not intended to be limiting. For example, additional or alternative layers 506 may be used in the feature extractor layer(s) 506, such as normalization layers, SoftMax layers, and/or other layer types.

The output of the feature extractor layer(s) 506 may be an input to one or more grouping layers 508. The grouping layer(s) 508A-508C may use one or more of the layer types described herein with respect to the feature extractor layer(s) 506. As described herein, the grouping layer(s) 508 may not include any fully connected layers, in some examples, to reduce processing speeds and decrease computing resource requirements. In such examples, the grouping layer(s) 508 may be referred to as fully convolutional layers.

Different orders and numbers of the layers 506 and 508 of the machine learning model(s) 502 may be used, depending on the embodiment. For example, where two or more cameras or other sensor types are used to generate inputs, there may be a different order and number of layers 506 and 508. As another example, different ordering and numbering of layers may be used depending on the type of sensor used to generate the image data 504, or the type of the image data 504 (e.g., RGB, YUV, etc.). As such, the order and number of layers 506 and 508 of the machine learning model(s) 502 is not limited to any one architecture.

In addition, some of the layers 506 and 508 may include parameters (e.g., weights and/or biases)—such as the feature extractor layer(s) 506 and/or the grouping layer(s) 508—while others may not, such as the ReLU layers and pooling layers, for example. In some examples, the parameters may be learned by the machine learning model(s) 502 during training. Further, some of the layers 506 and 508 may include additional hyper-parameters (e.g., learning rate, stride, epochs, kernel size, number of filters, type of pooling for pooling layers, etc.)—such as the convolutional layer(s), the deconvolutional layer(s), and the pooling layer(s)— while other layers may not, such as the ReLU layer(s). Various activation functions may be used, including but not limited to, ReLU, leaky ReLU, sigmoid, hyperbolic tangent (tan h), exponential linear unit (ELU), etc. The parameters, hyper-parameters, and/or activation functions are not to be limited and may differ depending on the embodiment.

In any example, the output of the machine learning model(s) 502 may include indications (e.g., confidences, probabilities, binary outputs, etc.) of positive images 510 (which may represent, and/or include, the positive images 124) and negative images 512 (which may represent, and/or include, the negative images 126). As described herein, the positive images 510 may include images that are associated with the first group for which the machine learning model(s) 502 is trained to identify and the negative images 512 may be associated with the second group.

Additionally, FIG. 6A illustrates first results associated with a first iteration of mining using the first classifier 112 (and/or the classifier 302), in accordance with some embodiments of the present disclosure. As shown, based at least on performing the first iteration of mining, the first classifier 112 may identify positive images 602 (which may represent, and/or include, the positive images 124) that include at least a first image 604, a second image 606, a third image 608, and a fourth image 610. In the example of FIG. 6A, the first image 604 depicts a speed limit sign 612, the second image 606 depicts a speed limit sign 614, the third image 608 depicts a speed limit sign 616, and the fourth image 610 depicts a stop sign 618. The first classifier 112 may also identify negative images 620 (which may represent, and/or include, the negative signs 126) that include at least a fifth image 622, a sixth image 624, and a seventh image 626. In the example of FIG. 6A, the fifth image 622 depicts a stop sign 628, the sixth image 624 depicts a stop sign 630, and the seventh image 626 depicts a construction sign 632.

In the example of FIG. 6A, the first classifier 112 may be trained to identify speed limit signs. As such, the first classifier 112 may correctly classify the first image 604, the second image 606, and the third image 608 as belonging to the positive images 602. Additionally, the first classifier 112 may correctly classify the fifth image 622, the sixth image 624, and the seventh image 626 as belonging to the negative images 620. However, the first classifier 112 may wrongfully classify the fourth image 610 as belonging to the positive images 602.

Referring back to the example of FIG. 1, the process 100 may include the training component 102 adding one or more images (e.g., each image) from the negative images 126 to the negative images 108. In some examples, the training component 102 (and/or the mining component 114) may include a selection component 128 that selects, using one or more techniques, which images from the negative images 126 to add to the negative images 108. For instance, the selection component 128 may select the images based at least on confidence values associated with the images. For example, the selection component 128 may select an image to be added to the negative images 108 based at least on a confidence value associated with the image satisfying (e.g., being equal to or greater than) a threshold confidence or determine not to add the image to the negative images 108 based at least on the confidence value not satisfying (e.g., being less than) the threshold confidence. In some examples, the first classifier 112 may determine the confidence values for the negative images 126.

For instance, and as described herein, the first classifier 112 may determine whether an image includes a negative image 126 or a positive image 124. When making the determination, the first classifier 112 may determine a first confidence that the image is a negative image 126 and/or a second confidence that the image is a positive image 124. As such, the selection component 128 may use one or more of these confidences when determining whether to add the image to the negative images 108. For a first example, if a confidence value that an image is a negative image 126 is 99% and a confidence threshold is 95%, then the selection component 128 may determine to add the negative image 126 to the negative images 108 based on the confidence value of 99% being greater than the threshold confidence of 95%. For a second example, if a confidence value that an image is a negative image 126 is 60% and a confidence threshold is again 95%, then the selection component 128 may determine not to add the negative image 126 to the negative images 108 based on the confidence value of 60% being less than the threshold confidence of 95%

The training component 102 may then repeat one or more of the processes described herein to update the first classifier 112 during a second iteration of training. For instance, the training component 102 may generate an updated training set 110 that includes at least the positive images 106 and the negative images 108 that now further include the image(s) from the negative images 126. The training component 102 may then train, during the second iteration of training, the first classifier 112 using the updated training set 110. As described herein, by updating the first classifier 112 using the updated training set 110 that includes the image(s) from the negative images 126, the performance of the first classifier 112 may improve.

For instance, the first classifier 112 may better (1) identify images depicting objects that are associated with the first group and/or images that depict one or more features of the objects associated with the first group and/or (2) identify images depicting objects that are not associated with the first group (e.g., objects that are associated with the second, different group) and/or images that depict one or more features that differ from the feature(s) of the objects associated with the first group. In some examples, the training component 102 further trains the first classifier 112 by further updating one or more parameters associated with the first classifier 112 using the updated training set 110 (e.g., such as by using the process 300 described with respect to FIG. 3).

Additionally, during a second iteration of mining, the process 100 may include the mining component 114 again performing one or more of the processes described herein, using the updated first classifier 112, in order to mine the image data 116 and/or only image data representing the positive images 124. For example, the updated first classifier 112 may process the image data 116 and/or the image data representing the positive images 124. Based at least on the processing, the updated first classifier 112 may identify updated positive images 124 and updated negative images 126. As described herein, in some examples, since the updated first classifier 112 is further trained during the second iteration of training, the performance of the updated first classifier 112 may increase such that the results are more accurate. For instance, the number of images included as part of the updated positive images 124 may be reduced by removing one or more images from the original positive images 124 that were wrongfully associated with the first group.

For instance, FIG. 6B illustrates second results associated with a second iteration of mining using the first classifier 112 (and/or the classifier 302), in accordance with some embodiments of the present disclosure. As shown, based at least on performing the second iteration of mining, the first classifier 112 may identify positive images 634 (which may represent, and/or include, the updated positive images 124) that include at least the first image 604, the second image 606, and the third image 608. In the example of FIG. 6B, the first image 604 depicts the speed limit sign 612, the second image 606 depicts the speed limit sign 614, and the third image 608 depicts the speed limit sign 616. The first classifier 112 may also identify negative images 636 (which may represent, and/or include, the updated negative signs 126) that include at least the fourth image 610, the fifth image 622, the sixth image 624, and the seventh image 626. In the example of FIG. 6B, the fourth image 610 depicts the stop sign 618, the fifth image 622 depicts the stop sign 628, the sixth image 624 depicts the stop sign 630, and the seventh image 626 depicts the construction sign 632.

In the example of FIG. 6B, the first classifier 112 may be trained to identify speed limit signs. As such, the first classifier 112 may correctly classify the first image 604, the second image 606, and the third image 608 as belonging to the positive images 634. Additionally, the first classifier 112 may correctly classify the fourth image 610, the fifth image 622, the sixth image 624, and the seventh image 626 as belonging to the negative images 636. As such, by training the first classifier 112 again during the second iteration of training, the first classifier 112 more correctly groups the images into the first group associated with the positive images 634 and the second group associated with the negative images 636.

In some examples, and with regard to the examples of FIGS. 6A-6B, the first classifier 112 may more correctly group the images since, during the second iteration of training, the first classifier 112 was trained with additional negative images 620 that included the fifth image 622 depicting the stop sign 628 and the sixth image 624 depicting the stop sign 630. As such, the first classifier 112 better learned that stop signs are not associated with the first group. Because of this, during the second iteration of mining, the first classifier 112 was able to classify the fourth image 610, which also depicts a stop sign, as including one of the negative images 636. Similar processes may be used to further train the first classifier 112 to differentiate between other types of signs included in the second group.

In some examples, and further with regard to the examples of FIGS. 6A-6B, the first classifier 112 may be able to detect objects for which the first classifier 112 was not originally trained. For example, even though the first classifier 112 may not have been originally trained to detect the speed limit sign 614, since it was not included in the original training data that included the positive images 202 and the negative images 208, the first classifier 112 is still able to correctly classify the second image 606 that depicts the speed limit sign 614. In some examples, this is because the speed limit sign 614 includes similar features as the speed limit sign 612 and the speed limit sign 616 for which the first classifier 112 was originally trained.

Referring back to the example of FIG. 1, the process 100 may continue to repeat using one or more additional iterations of training and/or one or more additional iterations of mining in order to continue improving the performance of the first classifier 112 and/or further improve the filtering of the images. In some examples, the process 100 may continue to repeat until the occurrence of one or more events. For a first example, the process 100 may continue to repeat until a KPI associated with the first classifier 112 satisfies (e.g., is equal to or greater than) a threshold performance level. The threshold performance level may include, but is not limited to, 80%, 85%, 90%, 95%, 99%, and/or any other percentage level. For a second example, the process 100 may continue to repeat until performing a set number of iterations of training and/or a set number of iterations of mining. A set number of iterations may include, but is not limited to, one iteration, two iterations, five iterations, ten iterations, and/or any other number of iterations.

The process 100 may further include using a second classifier 130, which may also include one or more machine learning models and/or one or more neural networks, and be referred to as a "fine-grained classifier 130," to process at least a portion of the positive images 124 in order to determine classifications associated with the objects depicted by the positive images 124. For example, and for an image, the second classifier 130 may be trained to determine an object classification associated with the object depicted by the image. As described herein, an object classification may include, but is not limited to, street sign, vehicle, pedestrian, road marking, structure, animate actor, static object, and/or any other classification. Additionally, in some examples, the object classification may be more specific. For a first example, if the positive images 124 depict objects that include street signs, then the object classification may include speed limit sign, stop sign, yield sign, construction sign, crosswalk sign, and/or the like. For a second example, if the positive images 124 depict objects that include speed limit signs, then the object classification may include 25 miles per hour (MPH) speed limit sign, 50 MPH speed limit sign, 60 MPH speed limit sign, 75 MPH speed limit sign, and/or the like.

In some examples, and as further illustrated in FIG. 1, the second classifier 130 may be trained and/or use synthetic data 132. For example, the synthetic data 132 may represent images depicting one or more types of objects for which the second classifier 130 is trained to classify. For a first example, if the second classifier 130 is trained to classify street signs, then the synthetic data 132 may represent synthetically produced images depicting various types of street signs. For a second example, if the second classifier 130 is trained to classify speed limit signs, then the synthetic data 132 may represent synthetically produced images depicting various types of speed limit signs. In some examples, the synthetic data 132 may be generated such that the second classifier 130 is able to process data representing objects for which there is no and/or little training data. For example, if the second classifier 130 is trained to again classify speed limit signs, but a specific speed limit sign is not represented by training data, then the synthetic data 132 may be generated to represent images depicting the specific speed limit sign.

The process 100 may then include storing the positive images 124 and/or the object classifications associated with the positive images 124 in one or more databases, where the positive images 124 and the classifications are represented by mined data 134. In some examples, the mined data 134 may then be used to perform one or more additional processes, such as to train one or more machine learning models and/or one or more neural networks to detect objects depicted by the images represented by the mined data 134.

In some examples, the process 100 may include performing one or more additional processes to determine whether additional processing needs to be performed for classifying the positive images 124 represented by the mined data 134. For example, and for an image, the process 100 may include generating additional image data representing one or more augmented images depicting the object (which may be represented by the synthetic data 132). The process 100 may then include the second classifier 130 processing the images in order to determine object classifications associated with the images. Additionally, the process 100 may include determining whether further processing should be performed on the image, such as human analysis, based at least on the classifications. For example, a determination that no additional processing needs to be performed may be made based at least on a threshold number of the classifications and/or a threshold percentage of the classifications being the same. As described herein, the threshold number may include, but is not limited to, two classifications, five classifications, ten classifications, and/or any other number of classifications. Additionally, the threshold percentage of classifications may include, but is not limited to, 75%, 80%, 90%, 95%, 99%, and/or any other percentage of classifications.

Figure 7:
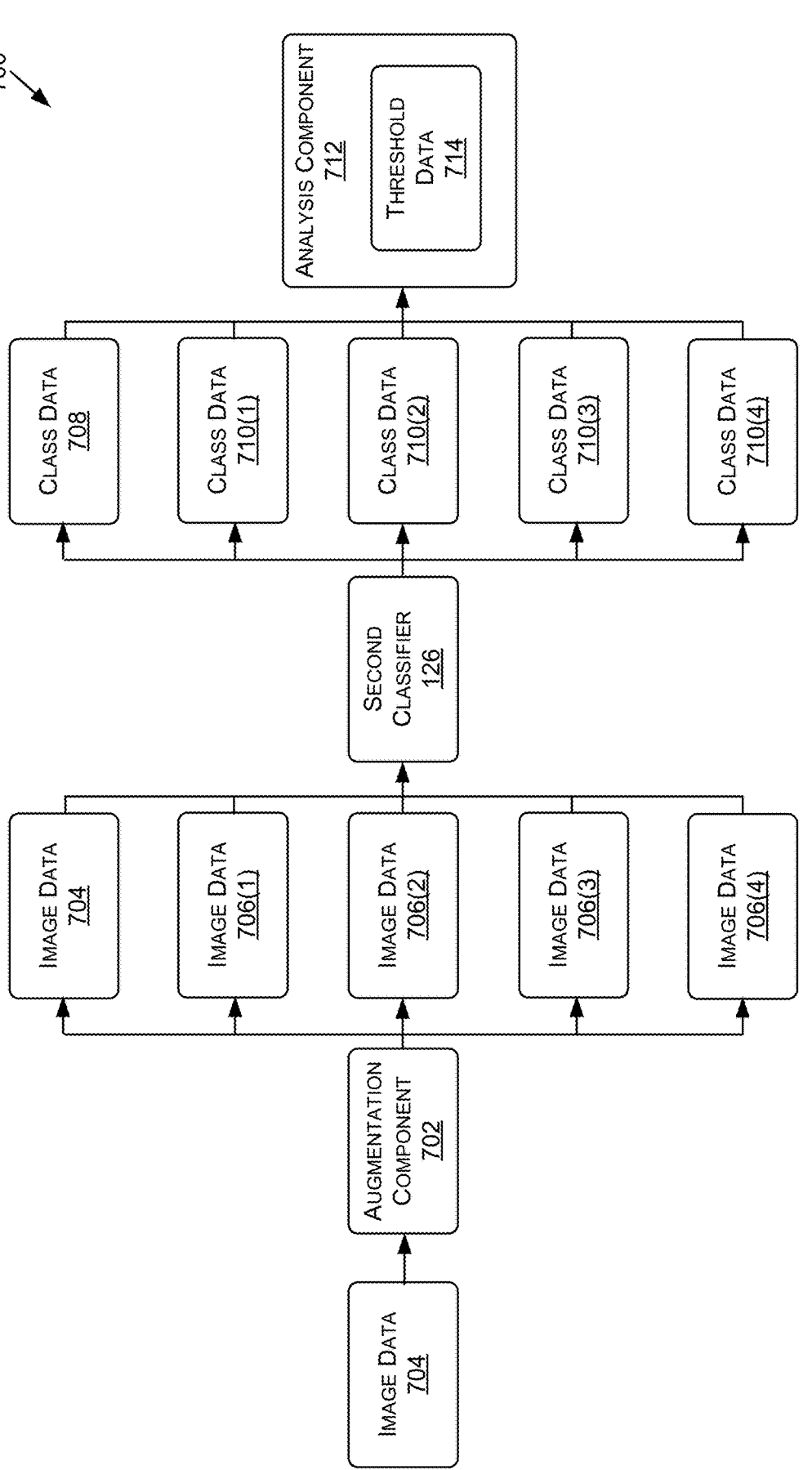
FIG. 7 illustrates an example of determining whether additional processing should be performed with respect to an image, in accordance with some embodiments of the present disclosure.

For instance, FIG. 7 illustrates an example of determining whether additional processing should be performed with regards to an image, in accordance with some embodiments of the present disclosure. As shown by the example of FIG. 7, an augmentation component 702 may process image data 704 representing an image, such as one of the positive images 124. Based at least on the processing, the augmentation component 702 may generate image data 706(1)-(4) (also referred to as "image data 706") representing four augmented images, where the augmented images depict a same object as the original image represented by the image data 704. While the example of FIG. 7 includes the augmentation component 702 generating the image data 706 representing the four augmented images, in other examples, the augmentation component 702 may generate image data representing any number of augmented images (e.g., one image, five images, ten images, etc.).

As further shown, the second classifier 130 may process the image data 704 and the image data 706. Based at least on the processing, the second classifier 130 may generate class data 708 representing the object classification associated with the image data 704 and class data 710(1)-(4) (also referred to as "class data 710") representing object classifications associated with the image data 706. For instance, the class data 708 may represent a classification of the object as depicted by the image represented by the image data 704 while the class data 710 represents classifications of the same object as depicted by the images represented by the image data 706. An analysis component 712 may then use the class data 708 along with the class data 710 to determine whether further processing should be performed with respect to the image data 704.

For a first example, the analysis component 712 may use the class data 708 and the class data 710 to determine the object classifications associated with the image data 704 and the image data 706. The analysis component 712 may then determine a number of the object classifications that are similar to the object classification represented by the class data 708. Additionally, the analysis component 712 may determine whether the number of object classifications satisfies (e.g., is equal to or greater than) a threshold number, where the threshold number is represented by threshold data 714. If the analysis component 712 determines that the number of classifications satisfies the threshold number, then the analysis component 712 may determine that no additional processing needs to be performed (e.g., the class data 708 associated with the image data 704 is correct). However, if the analysis component 712 determines that the number of classifications does not satisfy (e.g., is less than) the threshold number, then the analysis component 712 may determine that additional processing needs to be performed (e.g., the class data 708 associated with the image data 704 may be incorrect). As described herein, the additional processing may include an analysis performed by a human.

For a second example, the analysis component 712 may again use the class data 708 and the class data 710 to determine the object classifications associated with the image data 704 and the image data 706. The analysis component 712 may then determine a percentage of the object classifications that are similar to the object classification represented by the class data 708. Additionally, the analysis component 712 may determine whether the percentage of object classifications satisfies (e.g., is equal to or greater than) a threshold percentage, where the threshold percentage is also represented by the threshold data 714. If the analysis component 712 determines that the percentage of classifications satisfies the threshold percentage, then the analysis component 712 may determine that no additional processing needs to be performed (e.g., the class data 708 associated with the image data 704 is correct). However, if the analysis component 712 determines that the percentage of classifications does not satisfy (e.g., is less than) the threshold percentage, then the analysis component 712 may determine that additional processing needs to be performed (e.g., the class data 708 associated with the image data 704 may be incorrect). As described herein, the additional processing may include an analysis performed by a human.

Figure 8:
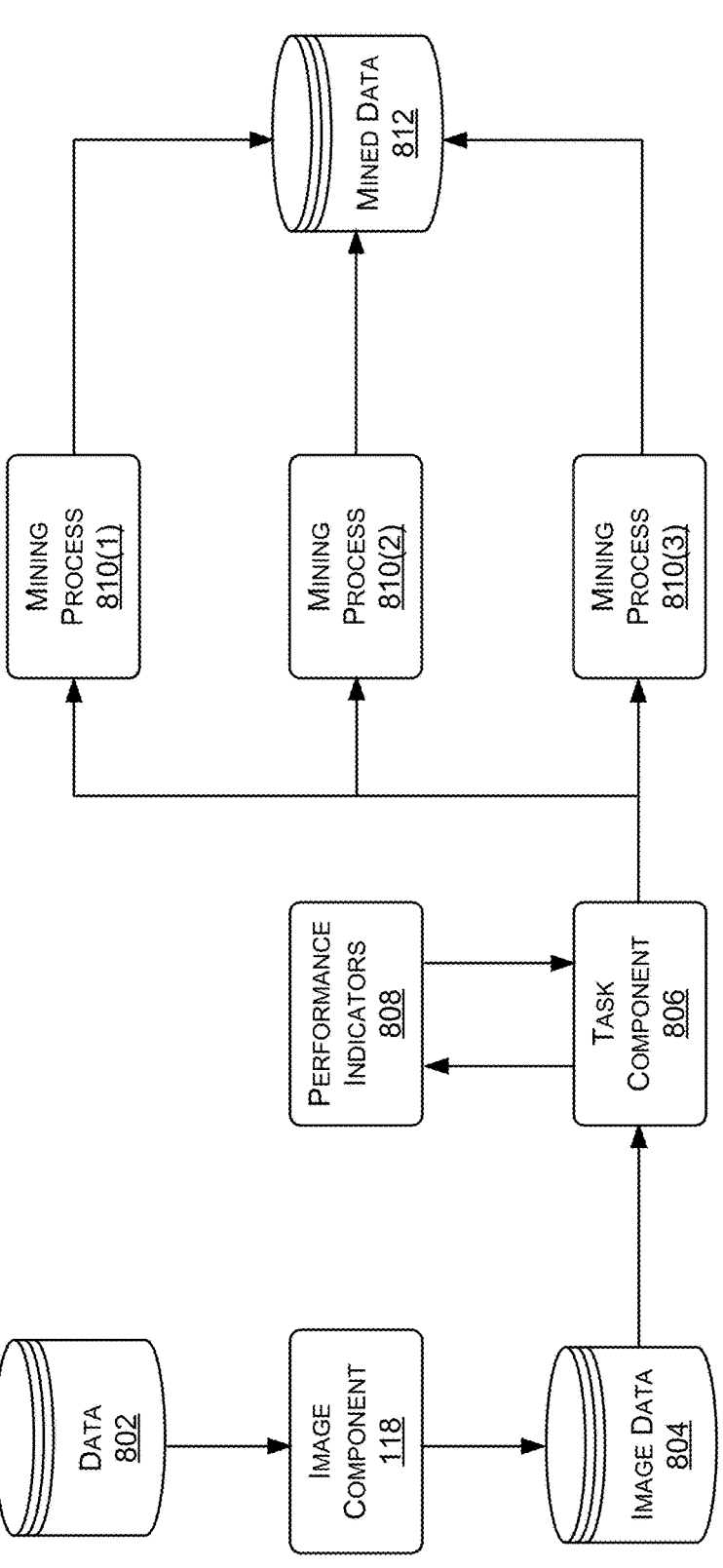
FIG. 8 illustrates an example data flow diagram for a process of determining when to perform data mining, in accordance with some embodiment of the present disclosure.

In some examples, one or more metrics may be used to determine when to perform the process 100 of FIG. 1. For instance, FIG. 8 illustrates an example data flow diagram for a process 800 of determining when to perform data mining, in accordance with some embodiment of the present disclosure. As shown, the process 800 may include the image component 118 processing data 802 (which may represent, and/or include, the data 120) that is stored in one or more databases. In some examples, the data 802 may include video data representing videos, image data representing images, and/or any other type of data. Based at least on the processing, the image component 118 may identify images depicting various objects and generate image data 804 using the images (e.g., using one or more similar processes as those described with respect to FIGS. 1 and 4), where the image data 804 is stored in one or more databases. In some examples, the image component 118 may generate the image data 804 using one or more additional processes, such as by cropping the images to depict more of the objects than other portions of the images and/or generating bounding shapes (e.g., bounding boxes) representing the locations of the objects within the images.

The process 800 may include a task component 806 using performance indicators 808, such as KPIs, to determine which mining tasks should be performed. For example, the task component 806 may use a performance indicator 808 associated with a processing component (e.g., a classifier, a machine learning model, a neural network, etc.) to determine whether the processing component needs additional training. In some examples, the task component 806 may determine that the processing component does not need additional training based at least on the performance indicator 808 satisfying (e.g., being equal to or greater than) a threshold level and determine that the processing component needs additional training based at least on the performance indicator not satisfying (e.g., being less than) the threshold level. The task component 806 may then perform similar processes for one or more additional processing components.

In some examples, if the task component 806 determines that a processing component needs additional training, then the task component 806 may determine a type of data to mine for performing the additional training. For a first example, if the processing component is associated with a perception system that is configured to classify street signs using image data, then the task component 806 may determine to cause a mining process to occur that retrieves image data representing images depicting street signs. For a second example, if the processing component is associated with a perception system that is configured to classify vehicles using image data, then the task component 806 may determine to cause a mining process to occur that retrieves image data representing images depicting vehicles.

The process 800 may then include causing one or more mining processes 810(1)-(3) (also referred to singularly as "mining process 810" or in plural as "mining processes 810") to occur. In some examples, one or more of the mining processes 810 (e.g., each of the mining processes 810) may be performed similar to the process 100. For instance, if the task component 806 determines that a processing component needs additional training, and the task component 806 further determines a type of data to mine for performing the additional training, then the task component 806 may cause the mining process 810 to occur that is configured to retrieve the type of data. For example, if a processing component that is associated with a perception system that is trained to classify street signs needs additional training, then the task component 806 may cause the mining process 810 to occur, where the mining process 810 is configured to retrieve image data representing images depicting street signs. As shown, the process 800 may include storing the mined data 812 (which may represent, and/or include, the mined data 134) in one or more databases.

In addition to, or alternatively from, using the performance indicators 808 to begin mining processes 810, in other examples, the task component 806 may use additional and/or alternative events to begin mining processes 810. For example, if a user wants to train a processing component to detect a specific type of object, such as a new street sign, then the task component 806 may receive, from one or more user device, data representing the specific type of object. The task component 806 may then cause a mining process 810 associated with retrieving image data for training the processing component to occur. By performing the processes described herein, in some examples, the task component 806 is able to identify relevant training data, such as images that depict similar objects (e.g., objects that share similar features as the specific type of object), such that the processing component may be trained even when there is no and/or little training data for the actual specific type of object.

Now referring to FIGS. 9 and 10, each block of methods 900 and 1000, described herein, comprises a computing process that may be performed using any combination of hardware, firmware, and/or software. For instance, various functions may be carried out by a processor executing instructions stored in memory. The methods 900 and 1000 may also be embodied as computer-usable instructions stored on computer storage media. The methods 900 and 1000 may be provided by a standalone application, a service or hosted service (standalone or in combination with another hosted service), or a plug-in to another product, to name a few. In addition, the methods 900 and 1000 are described, by way of example, with respect to FIG. 1. However, these methods 900 and 1000 may additionally or alternatively be executed by any one system, or any combination of systems, including, but not limited to, those described herein.

FIG. 9 illustrates a flow diagram showing a method 900 for performing data mining using a group classifier, in accordance with some embodiments of the present disclosure. The method 900, at block B902, may include receiving first image data representative of a first image and second image data representative of a second image. For instance, the mining component 114 may receive the first image data 116 representing the first image and the second image data 116 representing the second image. As described herein, in some examples, the first image data 116 and/or the second image data 116 may be generated using the image component 118 that processes the data 120. For instance, the image component 118 may generate the first image data 116 and/or the second image data 116 by identify specific types of objects depicted in one or more videos. In some examples, the first image data 116 and/or the second image data 116 may be unlabeled.

The method 900, at block B904, may include determining, using a first classifier, that the first image is associated with a first group and the second image is associated with a second group. For instance, the first classifier 112 may be trained to determine that the first image is associated with the first group, such that the first image is a positive image 124, and the second image is associated with the second group, such that the second image is a negative image 126. As described herein, the first group may be associated with first objects that share one or more common features. Additionally, the second group may be associated with second objects that do not include the first objects. In some examples, the first classifier 112 may go through one or more training iterations and/or one or more mining iterations to determine that the first image is associated with the first group and the second image is associated with the second group.

The method 900, at block B906, may include determining, using a second classifier and based at least on the first image being associated with the first group, a classification associated with the first image. For instance, the second classifier 130 may process the first image based at least on the first image being associated with the first group (e.g., including the positive image 124). Based at least on the processing, the second classifier 130 may determine the classification associated with the first image. For example, if the first image depicts a speed limit 55 MPH sign, then the classification may include street sign, speed limit sign, 55 MPH speed limit sign, and/or the like. In some examples, the second classifier 130 may perform one or more of the processes described herein to determine whether additional processing is needed to verify the classification.

The method 900, at block B908, may include storing the first image data representative of the first image and the classification associated with the first image. For instance, the image data 116 representing the first image and data representing the classification may be stored in one or more databases as mined data 134. In some examples, similar processes may be performed to store additional mined data 134 representing additional images and/or additional classifications associated with the additional images. In some embodiments, the mined data may be used to train one or more neural networks for object or feature detection and/or tracking operations. Once trained and deployed, the one or more neural networks may be used by one or more vehicles or machines—such as vehicle 1100—to aid in determining planning, control, and/or actuation functions.

FIG. 10 illustrates a flow diagram showing a method 1000 for performing iterations associated with data mining, in accordance with some embodiments of the present disclosure. The method 1000, at block B1002, may include receiving training data representative of one or more images and one or more classifications associated with the one or more images. For instance, the training component 102 may receive one or more positive images 106 associated with a first group and/or one or more negative images 108 associated with a second group. The training component 102 may then generate the training set 110 using the positive image(s) 106 and/or the negative image(s) 108.

The method 1000, at block B1004, may include updating, during a first iteration of training, one or more parameters associated with a classifier using the training data. For instance, the training component 102 may use the training set 110 to update the one or more parameters associated with the first classifier 112 during the first iteration of training. As described herein, the training component 102 may update the one or more parameters associated with the first classifier 112 using one or more training techniques.

The method 1000, at block B1006, may include determining, using the classifier, that a first image is associated with a first group and a second classifier is associated with a second group. For instance, after the first iteration of training, the first classifier 112 may process image data 116 representing the first image and the second image. Based at least on the processing, the first classifier 112 may determine that the first image is associated with the first group, such that the first image is a positive image 124, and the second image is associated with the second group, such that the second image is a negative image 126. As described herein, the first group may be associated with first objects that share one or more common features. Additionally, the second group may be associated with second objects that do not include the first objects.

The method 1000, at block B1008, may include generating updated training data by adding the second image to the training data. For instance, the training component 102 may add the second image to the negative image(s) 108 based at least on the second image being associated with the second group. The training component 102 may then generate an updated training set 110 using the positive image(s) 106 and the negative image(s) 108 that now include the second image.

The method 1000, at block B1010, may include updating, during a second iteration of training, the one or more parameters associated with the classifier using the updated training data. For instance, the training component 102 may use the updated training set 110 to update the one or more parameters associated with the first classifier 112 during the second iteration of training. As described herein, the training component 102 may update the one or more parameters associated with the first classifier 112 using one or more training techniques.

The method 1000, at block B1012, may include determining, using the classifier, whether the first image is associated with the first group or the second group. For instance, after the second iteration of training, the first classifier 112 may again process the image data 116 representing the first image. Based at least on the processing, the first classifier 112 may determine whether the first image is still associated with the first group, such that the first image is still a positive image 124, or if the first image is now associated with the second group, such that the first image is now a negative image 126. In some examples, the method 800 may continue to perform these processes for one or more additional iterations.

Example Autonomous Vehicle

Figure 11A:
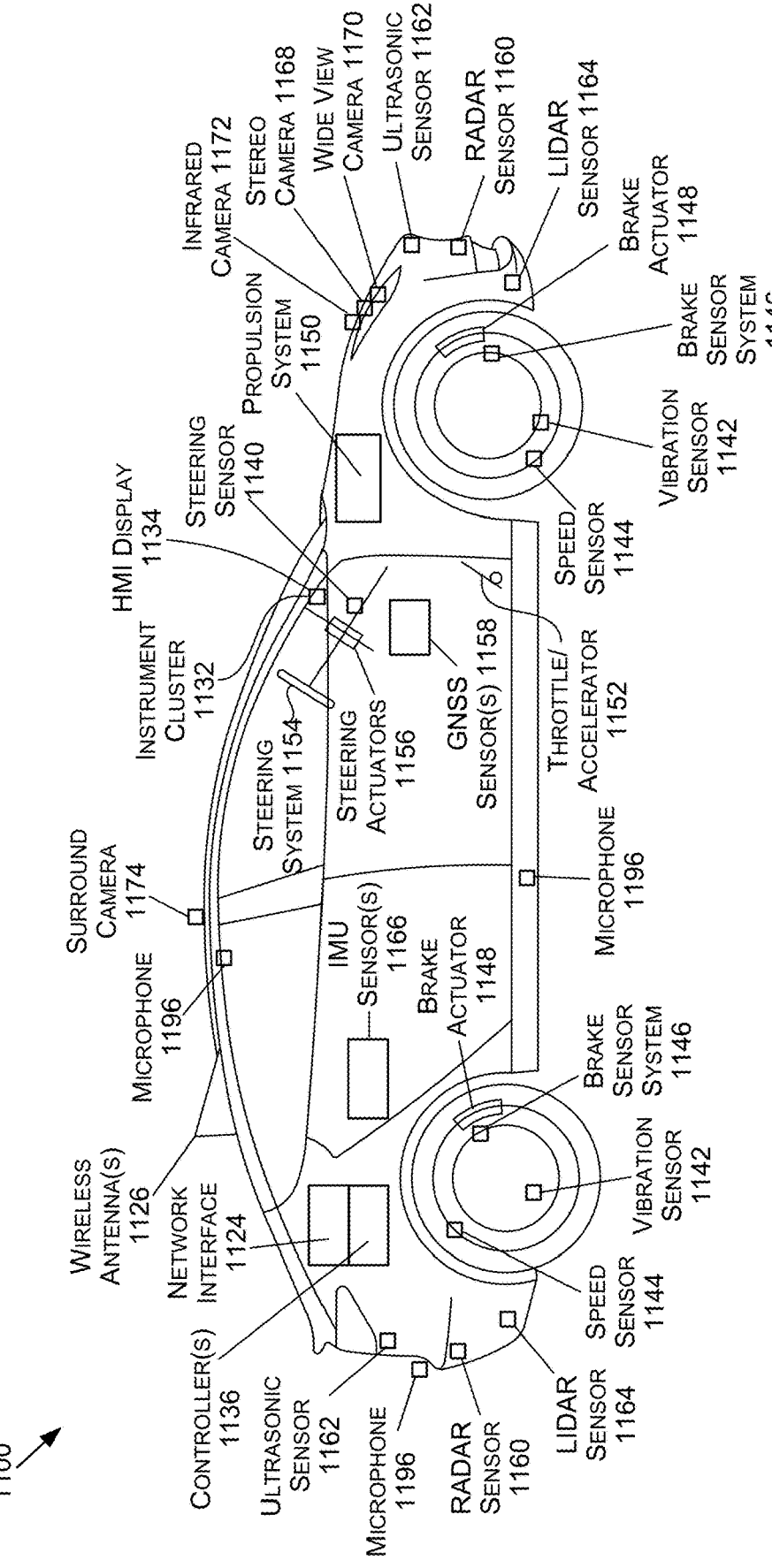
FIG. 11A is an illustration of an example autonomous vehicle, in accordance with some embodiments of the present disclosure.

FIG. 11A is an illustration of an example autonomous vehicle 1100, in accordance with some embodiments of the present disclosure. The autonomous vehicle 1100 (alternatively referred to herein as the "vehicle 1100") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1100 may be capable of functionality in accordance with one or more of Level 3-Level 5 of the autonomous driving levels. The vehicle 1100 may be capable of functionality in accordance with one or more of Level 1-Level 5 of the autonomous driving levels. For example, the vehicle 1100 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1100 or other machine, such as being fully autonomous, being highly autonomous, being conditionally autonomous, being partially autonomous, providing assistive autonomy, being semi-autonomous, being primarily autonomous, or other designation.

The vehicle 1100 may include components such as a chassis, a vehicle body, wheels (e.g., 2, 4, 6, 8, 18, etc.), tires, axles, and other components of a vehicle. The vehicle 1100 may include a propulsion system 1150, such as an internal combustion engine, hybrid electric power plant, an all-electric engine, and/or another propulsion system type. The propulsion system 1150 may be connected to a drive train of the vehicle 1100, which may include a transmission, to enable the propulsion of the vehicle 1100. The propulsion system 1150 may be controlled in response to receiving signals from the throttle/accelerator 1152.

A steering system 1154, which may include a steering wheel, may be used to steer the vehicle 1100 (e.g., along a desired path or route) when the propulsion system 1150 is operating (e.g., when the vehicle is in motion). The steering system 1154 may receive signals from a steering actuator 1156. The steering wheel may be optional for full automation (Level 5) functionality.

The brake sensor system 1146 may be used to operate the vehicle brakes in response to receiving signals from the brake actuators 1148 and/or brake sensors.

Controller(s) 1136, which may include one or more system on chips (SoCs) 1104 (FIG. 11C) and/or GPU(s), may provide signals (e.g., representative of commands) to one or more components and/or systems of the vehicle 1100. For example, the controller(s) may send signals to operate the vehicle brakes via one or more brake actuators 1148, to operate the steering system 1154 via one or more steering actuators 1156, to operate the propulsion system 1150 via one or more throttle/accelerators 1152. The controller(s) 1136 may include one or more onboard (e.g., integrated) computing devices (e.g., supercomputers) that process sensor signals, and output operation commands (e.g., signals representing commands) to enable autonomous driving and/or to assist a human driver in driving the vehicle 1100. The controller(s) 1136 may include a first controller 1136 for autonomous driving functions, a second controller 1136 for functional safety functions, a third controller 1136 for artificial intelligence functionality (e.g., computer vision), a fourth controller 1136 for infotainment functionality, a fifth controller 1136 for redundancy in emergency conditions, and/or other controllers. In some examples, a single controller 1136 may handle two or more of the above functionalities, two or more controllers 1136 may handle a single functionality, and/or any combination thereof.

The controller(s) 1136 may provide the signals for controlling one or more components and/or systems of the vehicle 1100 in response to sensor data received from one or more sensors (e.g., sensor inputs). The sensor data may be received from, for example and without limitation, global navigation satellite systems ("GNSS") sensor(s) 1158 (e.g., Global Positioning System sensor(s)), RADAR sensor(s) 1160, ultrasonic sensor(s) 1162, LIDAR sensor(s) 1164, inertial measurement unit (IMU) sensor(s) 1166 (e.g., accelerometer(s), gyroscope(s), magnetic compass(es), magnetometer(s), etc.), microphone(s) 1196, stereo camera(s) 1168, wide-view camera(s) 1170 (e.g., fisheye cameras), infrared camera(s) 1172, surround camera(s) 1174 (e.g., 360 degree cameras), long-range and/or mid-range camera(s) 1198, speed sensor(s) 1144 (e.g., for measuring the speed of the vehicle 1100), vibration sensor(s) 1142, steering sensor(s) 1140, brake sensor(s) (e.g., as part of the brake sensor system 1146), and/or other sensor types.

One or more of the controller(s) 1136 may receive inputs (e.g., represented by input data) from an instrument cluster 1132 of the vehicle 1100 and provide outputs (e.g., represented by output data, display data, etc.) via a human-machine interface (HMI) display 1134, an audible annunciator, a loudspeaker, and/or via other components of the vehicle 1100. The outputs may include information such as vehicle velocity, speed, time, map data (e.g., the High Definition ("HD") map 1122 of FIG. 11C), location data (e.g., the vehicle's 1100 location, such as on a map), direction, location of other vehicles (e.g., an occupancy grid), information about objects and status of objects as perceived by the controller(s) 1136, etc. For example, the HMI display 1134 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1100 further includes a network interface 1124 which may use one or more wireless antenna(s) 1126 and/or modem(s) to communicate over one or more networks. For example, the network interface 1124 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1126 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 11B:
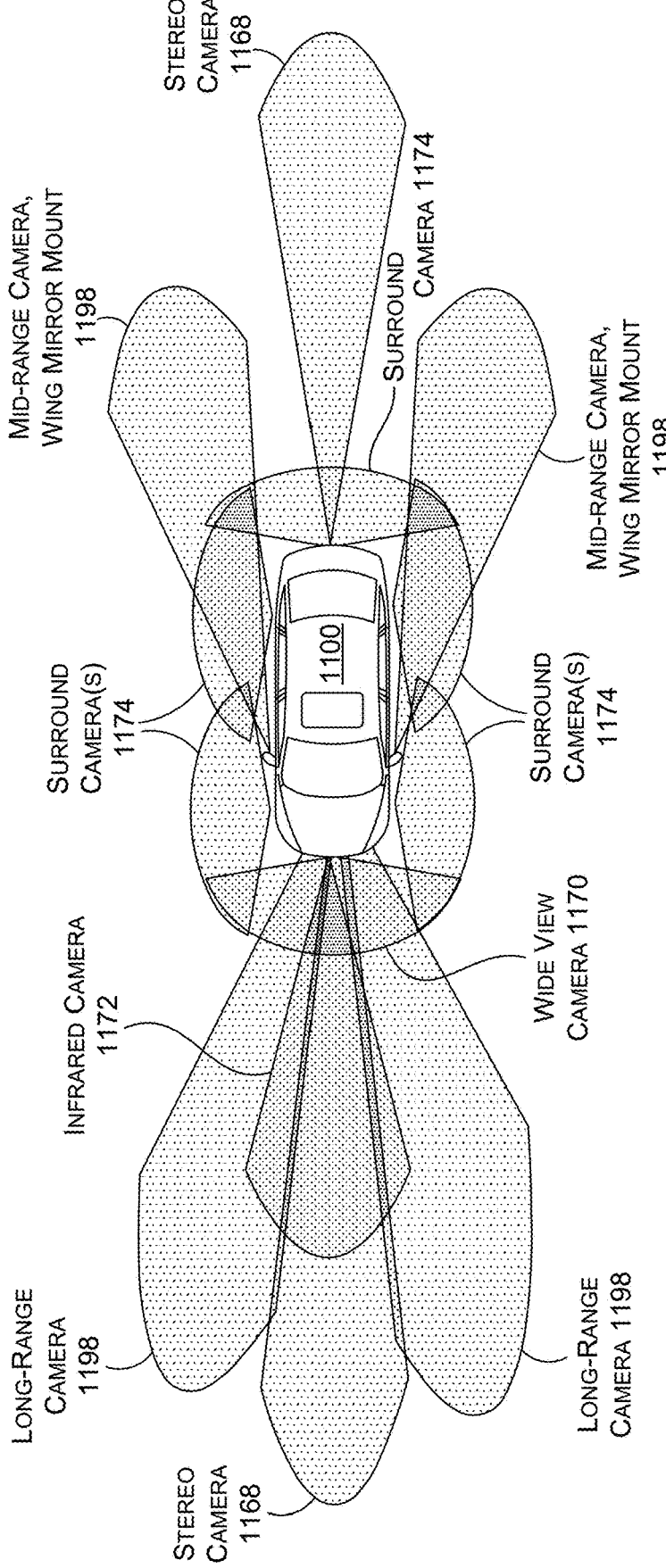
FIG. 11B is an example of camera locations and fields of view for the example autonomous vehicle of FIG. 11A, in accordance with some embodiments of the present disclosure.

FIG. 11B is an example of camera locations and fields of view for the example autonomous vehicle 1100 of FIG. 11A, in accordance with some embodiments of the present disclosure. The cameras and respective fields of view are one example embodiment and are not intended to be limiting. For example, additional and/or alternative cameras may be included and/or the cameras may be located at different locations on the vehicle 1100.

The camera types for the cameras may include, but are not limited to, digital cameras that may be adapted for use with the components and/or systems of the vehicle 1100. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, street sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1100 (e.g., front-facing cameras) may be used for surround view, to help identify forward facing paths and obstacles, as well aid in, with the help of one or more controllers 1136 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as street sign recognition.

A variety of cameras may be used in a front-facing configuration, including, for example, a monocular camera platform that includes a complementary metal oxide semiconductor ("CMOS") color imager. Another example may be a wide-view camera(s) 1170 that may be used to perceive objects coming into view from the periphery (e.g., pedestrians, crossing traffic or bicycles). Although only one wide-view camera is illustrated in FIG. 11B, there may be any number (including zero) of wide-view cameras 1170 on the vehicle 1100. In addition, any number of long-range camera(s) 1198 (e.g., a long-view stereo camera pair) may be used for depth-based object detection, especially for objects for which a neural network has not yet been trained. The long-range camera(s) 1198 may also be used for object detection and classification, as well as basic object tracking.

Any number of stereo cameras 1168 may also be included in a front-facing configuration. In at least one embodiment, one or more of stereo camera(s) 1168 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1168 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1168 may be used in addition to, or alternatively from, those described herein.

Cameras with a field of view that include portions of the environment to the side of the vehicle 1100 (e.g., side-view cameras) may be used for surround view, providing information used to create and update the occupancy grid, as well as to generate side impact collision warnings. For example, surround camera(s) 1174 (e.g., four surround cameras 1174 as illustrated in FIG. 11B) may be positioned to on the vehicle 1100. The surround camera(s) 1174 may include wide-view camera(s) 1170, fisheye camera(s), 360 degree camera(s), and/or the like. Four example, four fisheye cameras may be positioned on the vehicle's front, rear, and sides. In an alternative arrangement, the vehicle may use three surround camera(s) 1174 (e.g., left, right, and rear), and may leverage one or more other camera(s) (e.g., a forward-facing camera) as a fourth surround view camera.

Cameras with a field of view that include portions of the environment to the rear of the vehicle 1100 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1198, stereo camera(s) 1168), infrared camera(s) 1172, etc.), as described herein.

Figure 11C:
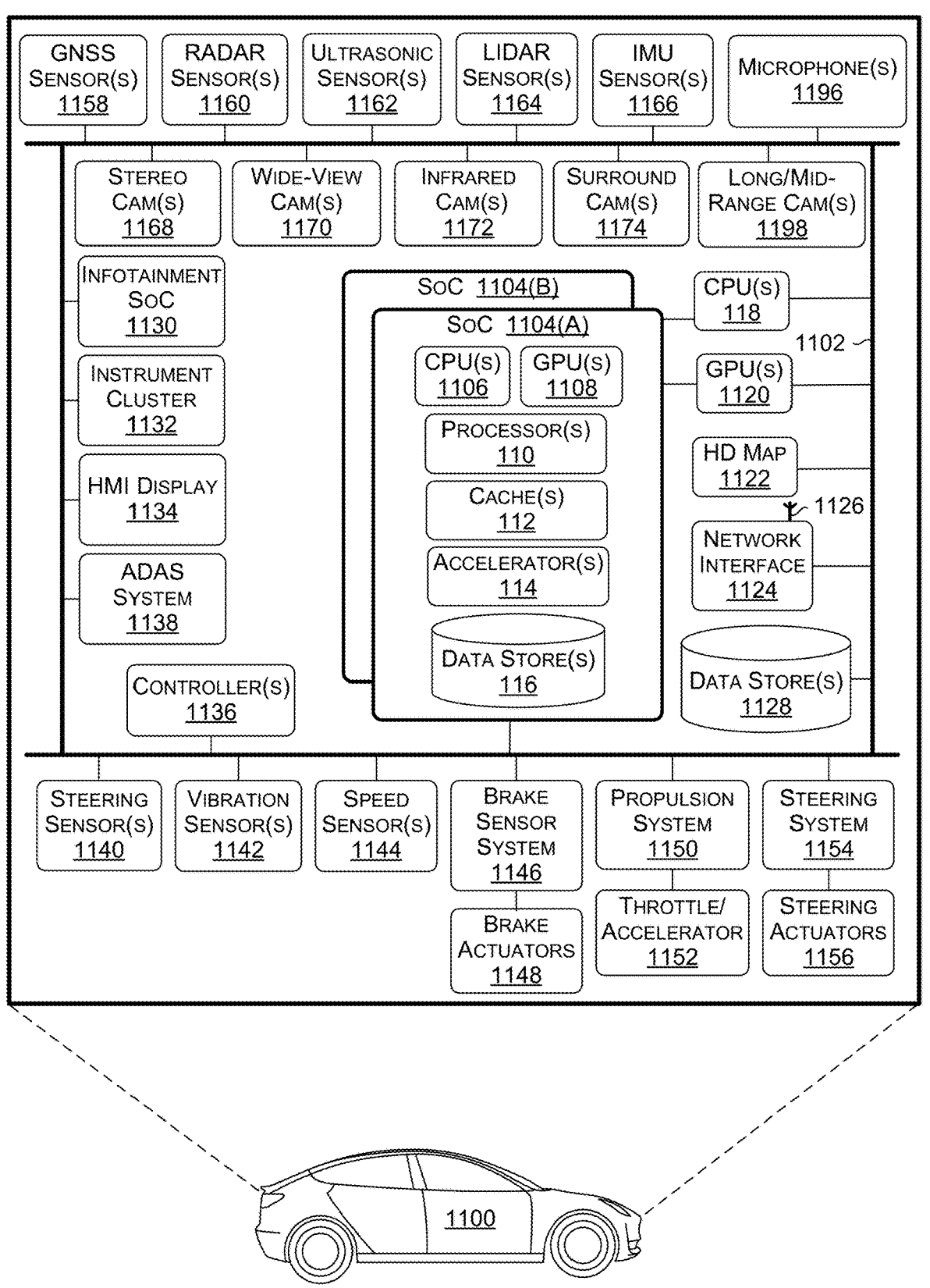
FIG. 11C is a block diagram of an example system architecture for the example autonomous vehicle of FIG. 11A, in accordance with some embodiments of the present disclosure.

FIG. 11C is a block diagram of an example system architecture for the example autonomous vehicle 1100 of FIG. 11A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1100 in FIG. 11C are illustrated as being connected via bus 1102. The bus 1102 may include a Controller Area Network (CAN) data interface (alternatively referred to herein as a "CAN bus"). A CAN may be a network inside the vehicle 1100 used to aid in control of various features and functionality of the vehicle 1100, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1102 is described herein as being a CAN bus, this is not intended to be limiting. For example, in addition to, or alternatively from, the CAN bus, FlexRay and/or Ethernet may be used. Additionally, although a single line is used to represent the bus 1102, this is not intended to be limiting. For example, there may be any number of busses 1102, which may include one or more CAN busses, one or more FlexRay busses, one or more Ethernet busses, and/or one or more other types of busses using a different protocol. In some examples, two or more busses 1102 may be used to perform different functions, and/or may be used for redundancy. For example, a first bus 1102 may be used for collision avoidance functionality and a second bus 1102 may be used for actuation control. In any example, each bus 1102 may communicate with any of the components of the vehicle 1100, and two or more busses 1102 may communicate with the same components. In some examples, each SoC 1104, each controller 1136, and/or each computer within the vehicle may have access to the same input data (e.g., inputs from sensors of the vehicle 1100), and may be connected to a common bus, such the CAN bus.

The vehicle 1100 may include one or more controller(s) 1136, such as those described herein with respect to FIG. 11A. The controller(s) 1136 may be used for a variety of functions. The controller(s) 1136 may be coupled to any of the various other components and systems of the vehicle 1100, and may be used for control of the vehicle 1100, artificial intelligence of the vehicle 1100, infotainment for the vehicle 1100, and/or the like.

The vehicle 1100 may include a system(s) on a chip (SoC) 1104. The SoC 1104 may include CPU(s) 1106, GPU(s) 1108, processor(s) 1110, cache(s) 1112, accelerator(s) 1114, data store(s) 1116, and/or other components and features not illustrated. The SoC(s) 1104 may be used to control the vehicle 1100 in a variety of platforms and systems. For example, the SoC(s) 1104 may be combined in a system (e.g., the system of the vehicle 1100) with an HD map 1122 which may obtain map refreshes and/or updates via a network interface 1124 from one or more servers (e.g., server(s) 1178 of FIG. 11D).

The CPU(s) 1106 may include a CPU cluster or CPU complex (alternatively referred to herein as a "CCPLEX"). The CPU(s) 1106 may include multiple cores and/or L2 caches. For example, in some embodiments, the CPU(s) 1106 may include eight cores in a coherent multi-processor configuration. In some embodiments, the CPU(s) 1106 may include four dual-core clusters where each cluster has a dedicated L2 cache (e.g., a 2 MB L2 cache). The CPU(s) 1106 (e.g., the CCPLEX) may be configured to support simultaneous cluster operation enabling any combination of the clusters of the CPU(s) 1106 to be active at any given time.

The CPU(s) 1106 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1106 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1108 may include an integrated GPU (alternatively referred to herein as an "iGPU"). The GPU(s) 1108 may be programmable and may be efficient for parallel workloads. The GPU(s) 1108, in some examples, may use an enhanced tensor instruction set. The GPU(s) 1108 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1108 may include at least eight streaming microprocessors. The GPU(s) 1108 may use compute application programming interface(s) (API(s)). In addition, the GPU(s) 1108 may use one or more parallel computing platforms and/or programming models (e.g., NVIDIA's CUDA).

The GPU(s) 1108 may be power-optimized for best performance in automotive and embedded use cases. For example, the GPU(s) 1108 may be fabricated on a Fin field-effect transistor (FinFET). However, this is not intended to be limiting and the GPU(s) 1108 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1108 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1108 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1108 to access the CPU(s) 1106 page tables directly. In such examples, when the GPU(s) 1108 memory management unit (MMU) experiences a miss, an address translation request may be transmitted to the CPU(s) 1106. In response, the CPU(s) 1106 may look in its page tables for the virtual-to-physical mapping for the address and transmits the translation back to the GPU(s) 1108. As such, unified memory technology may allow a single unified virtual address space for memory of both the CPU(s) 1106 and the GPU(s) 1108, thereby simplifying the GPU(s) 1108 programming and porting of applications to the GPU(s) 1108.

In addition, the GPU(s) 1108 may include an access counter that may keep track of the frequency of access of the GPU(s) 1108 to memory of other processors. The access counter may help ensure that memory pages are moved to the physical memory of the processor that is accessing the pages most frequently.

The SoC(s) 1104 may include any number of cache(s) 1112, including those described herein. For example, the cache(s) 1112 may include an L3 cache that is available to both the CPU(s) 1106 and the GPU(s) 1108 (e.g., that is connected both the CPU(s) 1106 and the GPU(s) 1108). The cache(s) 1112 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1104 may include an arithmetic logic unit(s) (ALU(s)) which may be leveraged in performing processing with respect to any of the variety of tasks or operations of the vehicle 1100—such as processing DNNs. In addition, the SoC(s) 1104 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1106 and/or GPU(s) 1108.

The SoC(s) 1104 may include one or more accelerators 1114 (e.g., hardware accelerators, software accelerators, or a combination thereof). For example, the SoC(s) 1104 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1108 and to off-load some of the tasks of the GPU(s) 1108 (e.g., to free up more cycles of the GPU(s) 1108 for performing other tasks). As an example, the accelerator(s) 1114 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1114 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1108, and by using an inference accelerator, for example, a designer may target either the DLA(s) or the GPU(s) 1108 for any function. For example, the designer may focus processing of CNNs and floating point operations on the DLA(s) and leave other functions to the GPU(s) 1108 and/or other accelerator(s) 1114.

The accelerator(s) 1114 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1106. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1114 (e.g., the hardware acceleration cluster) may include a computer vision network on-chip and SRAM, for providing a high-bandwidth, low latency SRAM for the accelerator(s) 1114. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1104 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1114 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1166 output that correlates with the vehicle 1100 orientation, distance, 3D location estimates of the object obtained from the neural network and/or other sensors (e.g., LIDAR sensor(s) 1164 or RADAR sensor(s) 1160), among others.

The SoC(s) 1104 may include data store(s) 1116 (e.g., memory). The data store(s) 1116 may be on-chip memory of the SoC(s) 1104, which may store neural networks to be executed on the GPU and/or the DLA. In some examples, the data store(s) 1116 may be large enough in capacity to store multiple instances of neural networks for redundancy and safety. The data store(s) 1112 may comprise L2 or L3 cache(s) 1112. Reference to the data store(s) 1116 may include reference to the memory associated with the PVA, DLA, and/or other accelerator(s) 1114, as described herein.

The SoC(s) 1104 may include one or more processor(s) 1110 (e.g., embedded processors). The processor(s) 1110 may include a boot and power management processor that may be a dedicated processor and subsystem to handle boot power and management functions and related security enforcement. The boot and power management processor may be a part of the SoC(s) 1104 boot sequence and may provide runtime power management services. The boot power and management processor may provide clock and voltage programming, assistance in system low power state transitions, management of SoC(s) 1104 thermals and temperature sensors, and/or management of the SoC(s) 1104 power states. Each temperature sensor may be implemented as a ring-oscillator whose output frequency is proportional to temperature, and the SoC(s) 1104 may use the ring-oscillators to detect temperatures of the CPU(s) 1106, GPU(s) 1108, and/or accelerator(s) 1114. If temperatures are determined to exceed a threshold, the boot and power management processor may enter a temperature fault routine and put the SoC(s) 1104 into a lower power state and/or put the vehicle 1100 into a chauffeur to safe stop mode (e.g., bring the vehicle 1100 to a safe stop).

The processor(s) 1110 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1110 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1110 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1110 may further include a real-time camera engine that may include a dedicated processor subsystem for handling real-time camera management.

The processor(s) 1110 may further include a high-dynamic range signal processor that may include an image signal processor that is a hardware engine that is part of the camera processing pipeline.

The processor(s) 1110 may include a video image compositor that may be a processing block (e.g., implemented on a microprocessor) that implements video post-processing functions needed by a video playback application to produce the final image for the player window. The video image compositor may perform lens distortion correction on wide-view camera(s) 1170, surround camera(s) 1174, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1108 is not required to continuously render new surfaces. Even when the GPU(s) 1108 is powered on and active doing 3D rendering, the video image compositor may be used to offload the GPU(s) 1108 to improve performance and responsiveness.

The SoC(s) 1104 may further include a mobile industry processor interface (MIPI) camera serial interface for receiving video and input from cameras, a high-speed interface, and/or a video input block that may be used for camera and related pixel input functions. The SoC(s) 1104 may further include an input/output controller(s) that may be controlled by software and may be used for receiving I/O signals that are uncommitted to a specific role.

The SoC(s) 1104 may further include a broad range of peripheral interfaces to enable communication with peripherals, audio codecs, power management, and/or other devices. The SoC(s) 1104 may be used to process data from cameras (e.g., connected over Gigabit Multimedia Serial Link and Ethernet), sensors (e.g., LIDAR sensor(s) 1164, RADAR sensor(s) 1160, etc. that may be connected over Ethernet), data from bus 1102 (e.g., speed of vehicle 1100, steering wheel position, etc.), data from GNSS sensor(s) 1158 (e.g., connected over Ethernet or CAN bus). The SoC(s) 1104 may further include dedicated high-performance mass storage controllers that may include their own DMA engines, and that may be used to free the CPU(s) 1106 from routine data management tasks.

The SoC(s) 1104 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1104 may be faster, more reliable, and even more energy-efficient and space-efficient than conventional systems. For example, the accelerator(s) 1114, when combined with the CPU(s) 1106, the GPU(s) 1108, and the data store(s) 1116, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1120) may include a text and word recognition, allowing the supercomputer to read and understand street signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a street sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1108.

In some examples, a CNN for facial recognition and vehicle owner identification may use data from camera sensors to identify the presence of an authorized driver and/or owner of the vehicle 1100. The always on sensor processing engine may be used to unlock the vehicle when the owner approaches the driver door and turn on the lights, and, in security mode, to disable the vehicle when the owner leaves the vehicle. In this way, the SoC(s) 1104 provide for security against theft and/or carjacking.

In another example, a CNN for emergency vehicle detection and identification may use data from microphones 1196 to detect and identify emergency vehicle sirens. In contrast to conventional systems, that use general classifiers to detect sirens and manually extract features, the SoC(s) 1104 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1158. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1162, until the emergency vehicle(s) passes.

The vehicle may include a CPU(s) 1118 (e.g., discrete CPU(s), or dCPU(s)), that may be coupled to the SoC(s) 1104 via a high-speed interconnect (e.g., PCIe). The CPU(s) 1118 may include an X86 processor, for example. The CPU(s) 1118 may be used to perform any of a variety of functions, including arbitrating potentially inconsistent results between ADAS sensors and the SoC(s) 1104, and/or monitoring the status and health of the controller(s) 1136 and/or infotainment SoC 1130, for example.

The vehicle 1100 may include a GPU(s) 1120 (e.g., discrete GPU(s), or dGPU(s)), that may be coupled to the SoC(s) 1104 via a high-speed interconnect (e.g., NVIDIA's NVLINK). The GPU(s) 1120 may provide additional artificial intelligence functionality, such as by executing redundant and/or different neural networks, and may be used to train and/or update neural networks based on input (e.g., sensor data) from sensors of the vehicle 1100.

The vehicle 1100 may further include the network interface 1124 which may include one or more wireless antennas 1126 (e.g., one or more wireless antennas for different communication protocols, such as a cellular antenna, a Bluetooth antenna, etc.). The network interface 1124 may be used to enable wireless connectivity over the Internet with the cloud (e.g., with the server(s) 1178 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1100 information about vehicles in proximity to the vehicle 1100 (e.g., vehicles in front of, on the side of, and/or behind the vehicle 1100). This functionality may be part of a cooperative adaptive cruise control functionality of the vehicle 1100.

The network interface 1124 may include a SoC that provides modulation and demodulation functionality and enables the controller(s) 1136 to communicate over wireless networks. The network interface 1124 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1100 may further include data store(s) 1128 which may include off-chip (e.g., off the SoC(s) 1104) storage. The data store(s) 1128 may include one or more storage elements including RAM, SRAM, DRAM, VRAM, Flash, hard disks, and/or other components and/or devices that may store at least one bit of data.

The vehicle 1100 may further include GNSS sensor(s) 1158. The GNSS sensor(s) 1158 (e.g., GPS, assisted GPS sensors, differential GPS (DGPS) sensors, etc.), to assist in mapping, perception, occupancy grid generation, and/or path planning functions. Any number of GNSS sensor(s) 1158 may be used, including, for example and without limitation, a GPS using a USB connector with an Ethernet to Serial (RS-232) bridge.

The vehicle 1100 may further include RADAR sensor(s) 1160. The RADAR sensor(s) 1160 may be used by the vehicle 1100 for long-range vehicle detection, even in darkness and/or severe weather conditions. RADAR functional safety levels may be ASIL B. The RADAR sensor(s) 1160 may use the CAN and/or the bus 1102 (e.g., to transmit data generated by the RADAR sensor(s) 1160) for control and to access object tracking data, with access to Ethernet to access raw data in some examples. A wide variety of RADAR sensor types may be used. For example, and without limitation, the RADAR sensor(s) 1160 may be suitable for front, rear, and side RADAR use. In some example, Pulse Doppler RADAR sensor(s) are used.

The RADAR sensor(s) 1160 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1160 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1100 surroundings at higher speeds with minimal interference from traffic in adjacent lanes. The other two antennae may expand the field of view, making it possible to quickly detect vehicles entering or leaving the vehicle's 1100 lane.

Mid-range RADAR systems may include, as an example, a range of up to 1160 m (front) or 80 m (rear), and a field of view of up to 42 degrees (front) or 1150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1100 may further include ultrasonic sensor(s) 1162. The ultrasonic sensor(s) 1162, which may be positioned at the front, back, and/or the sides of the vehicle 1100, may be used for park assist and/or to create and update an occupancy grid. A wide variety of ultrasonic sensor(s) 1162 may be used, and different ultrasonic sensor(s) 1162 may be used for different ranges of detection (e.g., 2.5 m, 4 m). The ultrasonic sensor(s) 1162 may operate at functional safety levels of ASIL B.

The vehicle 1100 may include LIDAR sensor(s) 1164. The LIDAR sensor(s) 1164 may be used for object and pedestrian detection, emergency braking, collision avoidance, and/or other functions. The LIDAR sensor(s) 1164 may be functional safety level ASIL B. In some examples, the vehicle 1100 may include multiple LIDAR sensors 1164 (e.g., two, four, six, etc.) that may use Ethernet (e.g., to provide data to a Gigabit Ethernet switch).

In some examples, the LIDAR sensor(s) 1164 may be capable of providing a list of objects and their distances for a 360-degree field of view. Commercially available LIDAR sensor(s) 1164 may have an advertised range of approximately 1100 m, with an accuracy of 2 cm-3 cm, and with support for a 1100 Mbps Ethernet connection, for example. In some examples, one or more non-protruding LIDAR sensors 1164 may be used. In such examples, the LIDAR sensor(s) 1164 may be implemented as a small device that may be embedded into the front, rear, sides, and/or corners of the vehicle 1100. The LIDAR sensor(s) 1164, in such examples, may provide up to a 120-degree horizontal and 35-degree vertical field-of-view, with a 200 m range even for low-reflectivity objects. Front-mounted LIDAR sensor(s) 1164 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1100. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1164 may be less susceptible to motion blur, vibration, and/or shock.

The vehicle may further include IMU sensor(s) 1166. The IMU sensor(s) 1166 may be located at a center of the rear axle of the vehicle 1100, in some examples. The IMU sensor(s) 1166 may include, for example and without limitation, an accelerometer(s), a magnetometer(s), a gyroscope(s), a magnetic compass(es), and/or other sensor types. In some examples, such as in six-axis applications, the IMU sensor(s) 1166 may include accelerometers and gyroscopes, while in nine-axis applications, the IMU sensor(s) 1166 may include accelerometers, gyroscopes, and magnetometers.

In some embodiments, the IMU sensor(s) 1166 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1166 may enable the vehicle 1100 to estimate heading without requiring input from a magnetic sensor by directly observing and correlating the changes in velocity from GPS to the IMU sensor(s) 1166. In some examples, the IMU sensor(s) 1166 and the GNSS sensor(s) 1158 may be combined in a single integrated unit.

The vehicle may include microphone(s) 1196 placed in and/or around the vehicle 1100. The microphone(s) 1196 may be used for emergency vehicle detection and identification, among other things.

The vehicle may further include any number of camera types, including stereo camera(s) 1168, wide-view camera(s) 1170, infrared camera(s) 1172, surround camera(s) 1174, long-range and/or mid-range camera(s) 1198, and/or other camera types. The cameras may be used to capture image data around an entire periphery of the vehicle 1100. The types of cameras used depends on the embodiments and requirements for the vehicle 1100, and any combination of camera types may be used to provide the necessary coverage around the vehicle 1100. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 11A and FIG. 11B.

The vehicle 1100 may further include vibration sensor(s) 1142. The vibration sensor(s) 1142 may measure vibrations of components of the vehicle, such as the axle(s). For example, changes in vibrations may indicate a change in road surfaces. In another example, when two or more vibration sensors 1142 are used, the differences between the vibrations may be used to determine friction or slippage of the road surface (e.g., when the difference in vibration is between a power-driven axle and a freely rotating axle).

The vehicle 1100 may include an ADAS system 1138. The ADAS system 1138 may include a SoC, in some examples. The ADAS system 1138 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1160, LIDAR sensor(s) 1164, and/or a camera(s). The ACC systems may include longitudinal ACC and/or lateral ACC. Longitudinal ACC monitors and controls the distance to the vehicle immediately ahead of the vehicle 1100 and automatically adjust the vehicle speed to maintain a safe distance from vehicles ahead. Lateral ACC performs distance keeping, and advises the vehicle 1100 to change lanes when necessary. Lateral ACC is related to other ADAS applications such as LCA and CWS.

CACC uses information from other vehicles that may be received via the network interface 1124 and/or the wireless antenna(s) 1126 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1100), while the I2V communication concept provides information about traffic further ahead. CACC systems may include either or both I2V and V2V information sources. Given the information of the vehicles ahead of the vehicle 1100, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1160, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1160, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1100 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1100 if the vehicle 1100 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1160, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1100 is backing up. Some RCTW systems include AEB to ensure that the vehicle brakes are applied to avoid a crash. RCTW systems may use one or more rear-facing RADAR sensor(s) 1160, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1100, the vehicle 1100 itself must, in the case of conflicting results, decide whether to heed the result from a primary computer or a secondary computer (e.g., a first controller 1136 or a second controller 1136). For example, in some embodiments, the ADAS system 1138 may be a backup and/or secondary computer for providing perception information to a backup computer rationality module. The backup computer rationality monitor may run a redundant diverse software on hardware components to detect faults in perception and dynamic driving tasks. Outputs from the ADAS system 1138 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1104.

In other examples, ADAS system 1138 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1138 may be fed into the primary computer's perception block and/or the primary computer's dynamic driving task block. For example, if the ADAS system 1138 indicates a forward crash warning due to an object immediately ahead, the perception block may use this information when identifying objects. In other examples, the secondary computer may have its own neural network which is trained and thus reduces the risk of false positives, as described herein.

The vehicle 1100 may further include the infotainment SoC 1130 (e.g., an in-vehicle infotainment system (IVI)). Although illustrated and described as a SoC, the infotainment system may not be a SoC, and may include two or more discrete components. The infotainment SoC 1130 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1100. For example, the infotainment SoC 1130 may radios, disk players, navigation systems, video players, USB and Bluetooth connectivity, carputers, in-car entertainment, Wi-Fi, steering wheel audio controls, hands free voice control, a heads-up display (HUD), an HMI display 1134, a telematics device, a control panel (e.g., for controlling and/or interacting with various components, features, and/or systems), and/or other components. The infotainment SoC 1130 may further be used to provide information (e.g., visual and/or audible) to a user(s) of the vehicle, such as information from the ADAS system 1138, autonomous driving information such as planned vehicle maneuvers, trajectories, surrounding environment information (e.g., intersection information, vehicle information, road information, etc.), and/or other information.

The infotainment SoC 1130 may include GPU functionality. The infotainment SoC 1130 may communicate over the bus 1102 (e.g., CAN bus, Ethernet, etc.) with other devices, systems, and/or components of the vehicle 1100. In some examples, the infotainment SoC 1130 may be coupled to a supervisory MCU such that the GPU of the infotainment system may perform some self-driving functions in the event that the primary controller(s) 1136 (e.g., the primary and/or backup computers of the vehicle 1100) fail. In such an example, the infotainment SoC 1130 may put the vehicle 1100 into a chauffeur to safe stop mode, as described herein.

The vehicle 1100 may further include an instrument cluster 1132 (e.g., a digital dash, an electronic instrument cluster, a digital instrument panel, etc.). The instrument cluster 1132 may include a controller and/or supercomputer (e.g., a discrete controller or supercomputer). The instrument cluster 1132 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1130 and the instrument cluster 1132. In other words, the instrument cluster 1132 may be included as part of the infotainment SoC 1130, or vice versa.

Figure 11D:
FIG. 11D is a system diagram for communication between cloud-based server(s) and the example autonomous vehicle of FIG. 11A, in accordance with some embodiments of the present disclosure.

FIG. 11D is a system diagram for communication between cloud-based server(s) and the example autonomous vehicle 1100 of FIG. 11A, in accordance with some embodiments of the present disclosure. The system 1176 may include server(s) 1178, network(s) 1190, and vehicles, including the vehicle 1100. The server(s) 1178 may include a plurality of GPUs 1184(A)-1184(H) (collectively referred to herein as GPUs 1184), PCIe switches 1182(A)-1182(H) (collectively referred to herein as PCIe switches 1182), and/or CPUs 1180(A)-1180(B) (collectively referred to herein as CPUs 1180). The GPUs 1184, the CPUs 1180, and the PCIe switches may be interconnected with high-speed interconnects such as, for example and without limitation, NVLink interfaces 1188 developed by NVIDIA and/or PCIe connections 1186. In some examples, the GPUs 1184 are connected via NVLink and/or NVSwitch SoC and the GPUs 1184 and the PCIe switches 1182 are connected via PCIe interconnects. Although eight GPUs 1184, two CPUs 1180, and two PCIe switches are illustrated, this is not intended to be limiting. Depending on the embodiment, each of the server(s) 1178 may include any number of GPUs 1184, CPUs 1180, and/or PCIe switches. For example, the server(s) 1178 may each include eight, sixteen, thirty-two, and/or more GPUs 1184.

The server(s) 1178 may receive, over the network(s) 1190 and from the vehicles, image data representative of images showing unexpected or changed road conditions, such as recently commenced road-work. The server(s) 1178 may transmit, over the network(s) 1190 and to the vehicles, neural networks 1192, updated neural networks 1192, and/or map information 1194, including information regarding traffic and road conditions. The updates to the map information 1194 may include updates for the HD map 1122, such as information regarding construction sites, potholes, detours, flooding, and/or other obstructions. In some examples, the neural networks 1192, the updated neural networks 1192, and/or the map information 1194 may have resulted from new training and/or experiences represented in data received from any number of vehicles in the environment, and/or based on training performed at a datacenter (e.g., using the server(s) 1178 and/or other servers).

The server(s) 1178 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1190, and/or the machine learning models may be used by the server(s) 1178 to remotely monitor the vehicles.

In some examples, the server(s) 1178 may receive data from the vehicles and apply the data to up-to-date real-time neural networks for real-time intelligent inferencing. The server(s) 1178 may include deep-learning supercomputers and/or dedicated AI computers powered by GPU(s) 1184, such as a DGX and DGX Station machines developed by NVIDIA. However, in some examples, the server(s) 1178 may include deep learning infrastructure that use only CPU-powered datacenters.

The deep-learning infrastructure of the server(s) 1178 may be capable of fast, real-time inferencing, and may use that capability to evaluate and verify the health of the processors, software, and/or associated hardware in the vehicle 1100. For example, the deep-learning infrastructure may receive periodic updates from the vehicle 1100, such as a sequence of images and/or objects that the vehicle 1100 has located in that sequence of images (e.g., via computer vision and/or other machine learning object classification techniques). The deep-learning infrastructure may run its own neural network to identify the objects and compare them with the objects identified by the vehicle 1100 and, if the results do not match and the infrastructure concludes that the AI in the vehicle 1100 is malfunctioning, the server(s) 1178 may transmit a signal to the vehicle 1100 instructing a fail-safe computer of the vehicle 1100 to assume control, notify the passengers, and complete a safe parking maneuver.

For inferencing, the server(s) 1178 may include the GPU(s) 1184 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 12:
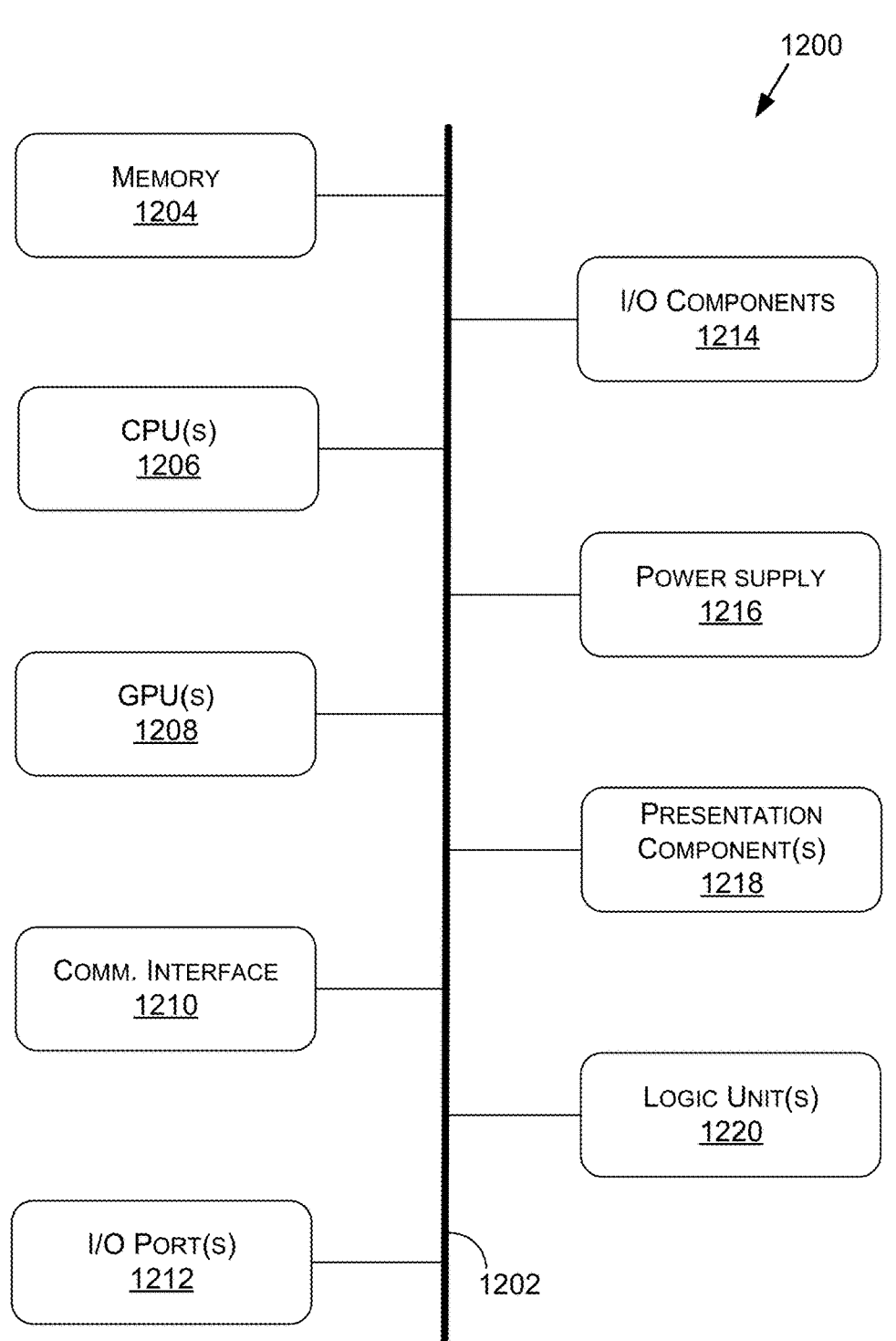
FIG. 12 is a block diagram of an example computing device suitable for use in implementing some embodiments of the present disclosure.

FIG. 12 is a block diagram of an example computing device(s) 1200 suitable for use in implementing some embodiments of the present disclosure. Computing device 1200 may include an interconnect system 1202 that directly or indirectly couples the following devices: memory 1204, one or more central processing units (CPUs) 1206, one or more graphics processing units (GPUs) 1208, a communication interface 1210, input/output (I/O) ports 1212, input/output components 1214, a power supply 1216, one or more presentation components 1218 (e.g., display(s)), and one or more logic units 1220. In at least one embodiment, the computing device(s) 1200 may comprise one or more virtual machines (VMs), and/or any of the components thereof may comprise virtual components (e.g., virtual hardware components). For non-limiting examples, one or more of the GPUs 1208 may comprise one or more vGPUs, one or more of the CPUs 1206 may comprise one or more vCPUs, and/or one or more of the logic units 1220 may comprise one or more virtual logic units. As such, a computing device(s) 1200 may include discrete components (e.g., a full GPU dedicated to the computing device 1200), virtual components (e.g., a portion of a GPU dedicated to the computing device 1200), or a combination thereof.

Although the various blocks of FIG. 12 are shown as connected via the interconnect system 1202 with lines, this is not intended to be limiting and is for clarity only. For example, in some embodiments, a presentation component 1218, such as a display device, may be considered an I/O component 1214 (e.g., if the display is a touch screen). As another example, the CPUs 1206 and/or GPUs 1208 may include memory (e.g., the memory 1204 may be representative of a storage device in addition to the memory of the GPUs 1208, the CPUs 1206, and/or other components). In other words, the computing device of FIG. 12 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 12.

The interconnect system 1202 may represent one or more links or busses, such as an address bus, a data bus, a control bus, or a combination thereof. The interconnect system 1202 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1206 may be directly connected to the memory 1204. Further, the CPU 1206 may be directly connected to the GPU 1208. Where there is direct, or point-to-point connection between components, the interconnect system 1202 may include a PCIe link to carry out the connection. In these examples, a PCI bus need not be included in the computing device 1200.

The memory 1204 may include any of a variety of computer-readable media. The computer-readable media may be any available media that may be accessed by the computing device 1200. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1204 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1200. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1206 may be configured to execute at least some of the computer-readable instructions to control one or more components of the computing device 1200 to perform one or more of the methods and/or processes described herein. The CPU(s) 1206 may each include one or more cores (e.g., one, two, four, eight, twenty-eight, seventy-two, etc.) that are capable of handling a multitude of software threads simultaneously. The CPU(s) 1206 may include any type of processor, and may include different types of processors depending on the type of computing device 1200 implemented (e.g., processors with fewer cores for mobile devices and processors with more cores for servers). For example, depending on the type of computing device 1200, the processor may be an Advanced RISC Machines (ARM) processor implemented using Reduced Instruction Set Computing (RISC) or an x86 processor implemented using Complex Instruction Set Computing (CISC). The computing device 1200 may include one or more CPUs 1206 in addition to one or more microprocessors or supplementary co-processors, such as math co-processors.

In addition to or alternatively from the CPU(s) 1206, the GPU(s) 1208 may be configured to execute at least some of the computer-readable instructions to control one or more components of the computing device 1200 to perform one or more of the methods and/or processes described herein. One or more of the GPU(s) 1208 may be an integrated GPU (e.g., with one or more of the CPU(s) 1206 and/or one or more of the GPU(s) 1208 may be a discrete GPU. In embodiments, one or more of the GPU(s) 1208 may be a coprocessor of one or more of the CPU(s) 1206. The GPU(s) 1208 may be used by the computing device 1200 to render graphics (e.g., 3D graphics) or perform general purpose computations. For example, the GPU(s) 1208 may be used for General-Purpose computing on GPUs (GPGPU). The GPU(s) 1208 may include hundreds or thousands of cores that are capable of handling hundreds or thousands of software threads simultaneously. The GPU(s) 1208 may generate pixel data for output images in response to rendering commands (e.g., rendering commands from the CPU(s) 1206 received via a host interface). The GPU(s) 1208 may include graphics memory, such as display memory, for storing pixel data or any other suitable data, such as GPGPU data. The display memory may be included as part of the memory 1204. The GPU(s) 1208 may include two or more GPUs operating in parallel (e.g., via a link). The link may directly connect the GPUs (e.g., using NVLINK) or may connect the GPUs through a switch (e.g., using NVSwitch). When combined together, each GPU 1208 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1206 and/or the GPU(s) 1208, the logic unit(s) 1220 may be configured to execute at least some of the computer-readable instructions to control one or more components of the computing device 1200 to perform one or more of the methods and/or processes described herein. In embodiments, the CPU(s) 1206, the GPU(s) 1208, and/or the logic unit(s) 1220 may discretely or jointly perform any combination of the methods, processes and/or portions thereof. One or more of the logic units 1220 may be part of and/or integrated in one or more of the CPU(s) 1206 and/or the GPU(s) 1208 and/or one or more of the logic units 1220 may be discrete components or otherwise external to the CPU(s) 1206 and/or the GPU(s) 1208. In embodiments, one or more of the logic units 1220 may be a coprocessor of one or more of the CPU(s) 1206 and/or one or more of the GPU(s) 1208.

Examples of the logic unit(s) 1220 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1210 may include one or more receivers, transmitters, and/or transceivers that enable the computing device 1200 to communicate with other computing devices via an electronic communication network, included wired and/or wireless communications. The communication interface 1210 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1220 and/or communication interface 1210 may include one or more data processing units (DPUs) to transmit data received over a network and/or through interconnect system 1202 directly to (e.g., a memory of) one or more GPU(s) 1208.

The I/O ports 1212 may enable the computing device 1200 to be logically coupled to other devices including the I/O components 1214, the presentation component(s) 1218, and/or other components, some of which may be built in to (e.g., integrated in) the computing device 1200. Illustrative I/O components 1214 include a microphone, mouse, keyboard, joystick, game pad, game controller, satellite dish, scanner, printer, wireless device, etc. The I/O components 1214 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be include depth cameras, such as stereoscopic camera systems, infrared camera systems, RGB camera systems, touchscreen technology, and combinations of these, for gesture detection and recognition. Additionally, the computing device 1200 may include accelerometers or gyroscopes (e.g., as part of an inertia measurement unit (IMU)) that enable detection of motion. In some examples, the output of the accelerometers or gyroscopes may be used by the computing device 1200 to render immersive augmented reality or virtual reality.

The power supply 1216 may include a hard-wired power supply, a battery power supply, or a combination thereof. The power supply 1216 may provide power to the computing device 1200 to enable the components of the computing device 1200 to operate.

The presentation component(s) 1218 may include a display (e.g., a monitor, a touch screen, a television screen, a heads-up-display (HUD), other display types, or a combination thereof), speakers, and/or other presentation components. The presentation component(s) 1218 may receive data from other components (e.g., the GPU(s) 1208, the CPU(s) 1206, DPUs, etc.), and output the data (e.g., as an image, video, sound, etc.).

Example Data Center

Figure 13:
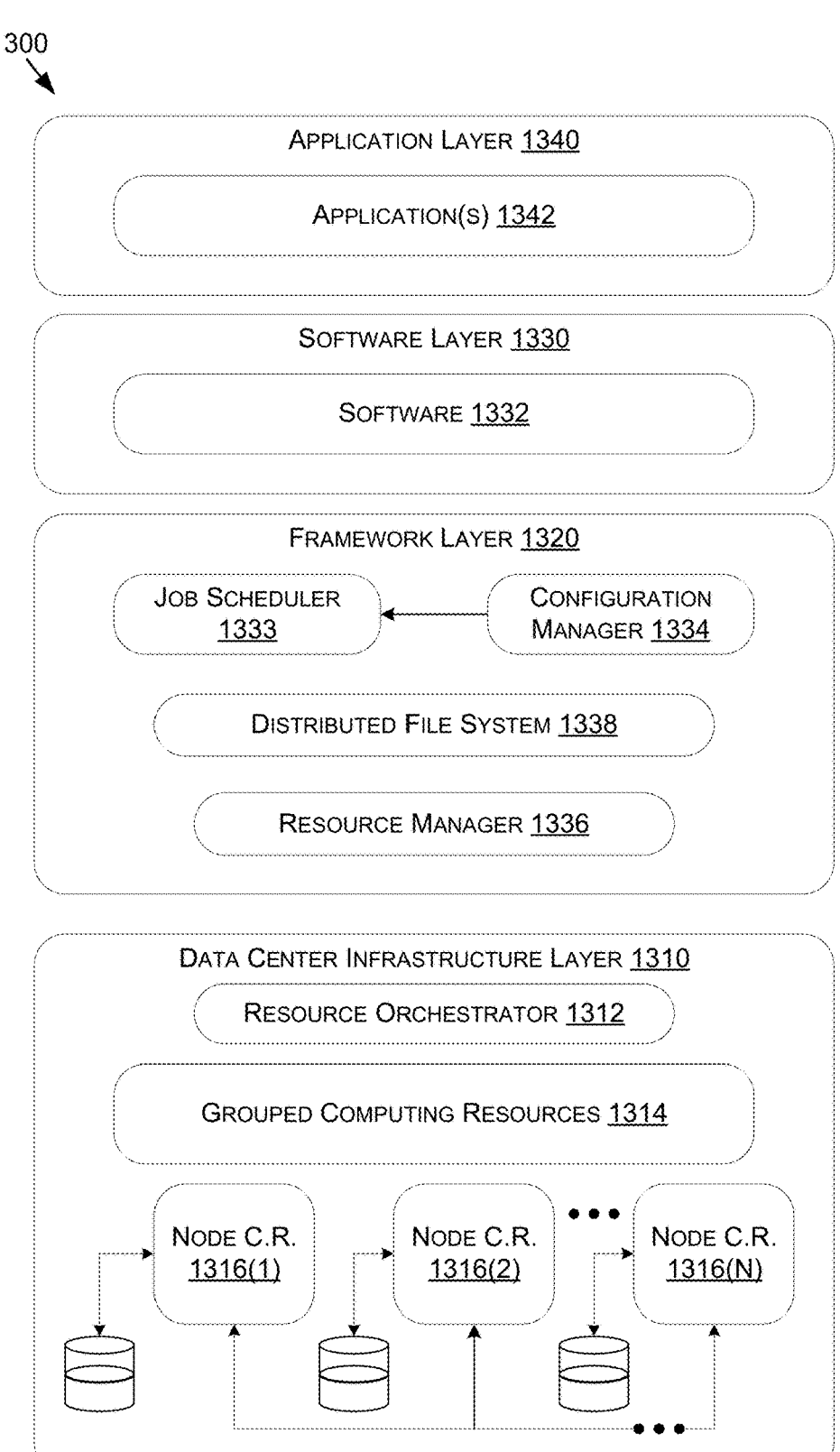
FIG. 13 is a block diagram of an example data center suitable for use in implementing some embodiments of the present disclosure.

FIG. 13 illustrates an example data center 1300 that may be used in at least one embodiments of the present disclosure. The data center 1300 may include a data center infrastructure layer 1310, a framework layer 1320, a software layer 1330, and/or an application layer 1340.

As shown in FIG. 13, the data center infrastructure layer 1310 may include a resource orchestrator 1312, grouped computing resources 1314, and node computing resources ("node C.R.s") 1316(1)-1316(N), where "N" represents any whole, positive integer. In at least one embodiment, node C.R.s 1316(1)-1316(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1316(1)-1316(N) may correspond to a server having one or more of the above-mentioned computing resources. In addition, in some embodiments, the node C.R.s 1316(1)-13161 (N) may include one or more virtual components, such as vGPUs, vCPUs, and/or the like, and/or one or more of the node C.R.s 1316(1)-1316(N) may correspond to a virtual machine (VM).

In at least one embodiment, grouped computing resources 1314 may include separate groupings of node C.R.s 1316 housed within one or more racks (not shown), or many racks housed in data centers at various geographical locations (also not shown). Separate groupings of node C.R.s 1316 within grouped computing resources 1314 may include grouped compute, network, memory or storage resources that may be configured or allocated to support one or more workloads. In at least one embodiment, several node C.R.s 1316 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1312 may configure or otherwise control one or more node C.R.s 1316(1)-1316(N) and/or grouped computing resources 1314. In at least one embodiment, resource orchestrator 1312 may include a software design infrastructure (SDI) management entity for the data center 1300. The resource orchestrator 1312 may include hardware, software, or some combination thereof.

In at least one embodiment, as shown in FIG. 13, framework layer 1320 may include a job scheduler 1333, a configuration manager 1334, a resource manager 1336, and/or a distributed file system 1338. The framework layer 1320 may include a framework to support software 1332 of software layer 1330 and/or one or more application(s) 1342 of application layer 1340. The software 1332 or application(s) 1342 may respectively include web-based service software or applications, such as those provided by Amazon Web Services, Google Cloud and Microsoft Azure. The framework layer 1320 may be, but is not limited to, a type of free and open-source software web application framework such as Apache Spark™ (hereinafter "Spark") that may utilize distributed file system 1338 for large-scale data processing (e.g., "big data"). In at least one embodiment, job scheduler 1333 may include a Spark driver to facilitate scheduling of workloads supported by various layers of data center 1300. The configuration manager 1334 may be capable of configuring different layers such as software layer 1330 and framework layer 1320 including Spark and distributed file system 1338 for supporting large-scale data processing. The resource manager 1336 may be capable of managing clustered or grouped computing resources mapped to or allocated for support of distributed file system 1338 and job scheduler 1333. In at least one embodiment, clustered or grouped computing resources may include grouped computing resource 1314 at data center infrastructure layer 1310. The resource manager 1336 may coordinate with resource orchestrator 1312 to manage these mapped or allocated computing resources.

In at least one embodiment, software 1332 included in software layer 1330 may include software used by at least portions of node C.R.s 1316(1)-1316(N), grouped computing resources 1314, and/or distributed file system 1338 of framework layer 1320. One or more types of software may include, but are not limited to, Internet web page search software, e-mail virus scan software, database software, and streaming video content software.

In at least one embodiment, application(s) 1342 included in application layer 1340 may include one or more types of applications used by at least portions of node C.R.s 1316 (1)-1316(N), grouped computing resources 1314, and/or distributed file system 1338 of framework layer 1320. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1334, resource manager 1336, and resource orchestrator 1312 may implement any number and type of self-modifying actions based on any amount and type of data acquired in any technically feasible fashion. Self-modifying actions may relieve a data center operator of data center 1300 from making possibly bad configuration decisions and possibly avoiding underutilized and/or poor performing portions of a data center.

The data center 1300 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1300. In at least one embodiment, trained or deployed machine learning models corresponding to one or more neural networks may be used to infer or predict information using resources described above with respect to the data center 1300 by using weight parameters calculated through one or more training techniques, such as but not limited to those described herein.

In at least one embodiment, the data center 1300 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1200 of FIG. 12—e.g., each device may include similar components, features, and/or functionality of the computing device(s) 1200. In addition, where backend devices (e.g., servers, NAS, etc.) are implemented, the backend devices may be included as part of a data center 1300, an example of which is described in more detail herein with respect to FIG. 13.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1200 described herein with respect to FIG. 12. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Example Clauses

A: A method comprising: determining, using a first classifier and based at least on first image data representative of a first image and second image data representative of a second image, that the first image is associated with a first group and the second image is associated with a second group; determining, using a second classifier and based at least on the first image being associated with the first group, a classification associated with the first image; and storing, in one or more databases, the first image data representative of the first image and the classification associated with the first image.

B: The method of paragraph A, further comprising: receiving training data that includes at least third image data representative of a third image that is associated with the first group and fourth image data representative of a fourth image that is associated with the second group; and training the first classifier using at least the training data.

C: The method of paragraph B, wherein the training the first classifier is associated with a first training iteration, and wherein the method further comprising: generating, based at least on the second image being associated with the second group, updated training data by adding the second image data to the training data; and further training, during a second training iteration, the first classifier using at least the updated training data.

D: The method of paragraph C, wherein the determining that the first image is associated with the first group and the second image is associated with the second group occurs after the first training iteration, and the method further comprises: after the first training iteration, determining, using the first classifier and based at least on fifth image data representative of a fifth image, that the fifth image is associated with the first group; and after the second training iteration, determining, using the first classifier and based at least on the fifth image data representative of the fifth image, that the fifth image is associated with the second group.

E: The method of any of paragraphs A-D, wherein: the first group is associated with one or more first objects that include one or more features; and the second group is associated with one or more second objects that do not include at least one of the one or more features.

F: The method of any of paragraphs A-E, further comprising: determining that a key performance indicator associated with one or more machine learning models that are trained to identify one or more objects associated with the first group does not satisfy a threshold; and determining, based at least on the key performance indicator not satisfying the threshold, to retrieve at least the first image data associated with the first group.

G: The method of any of paragraphs A-F, further comprising: generating, based at least on the first image data, third image data representative of a third image, the third image including an augmented image associated with the first image; determining, using the second classifier and based at least on the third image data, a second classification associated with the third image; and determining whether to further analyze the first image data based at least on the classification associated with the first image and the second classification associated with the third image.

H: The method of paragraph G, wherein the determining whether to further analyze the first image data comprises one of: determining to use human analysis associated with the first image data based at least on the classification associated with the first image including a different classification than the second classification associated with the third image; or determining to refrain from using the human analysis associated with the first image data based at least on the classification associated with the first image including a same classification as the second classification associated with the third image.

I: The method of any of paragraphs A-H, further comprising: determining, using one or more machine learning models and based at least on video data representative of a video, that a first frame of the video depicts a first object and a second frame of the video depicts a second object; generating, based at least on the first frame, the first image data representative of the first image, the first image depicting the first object; and generating, based at least on the second frame, the second image data representative of the second image, the second image depicting the second object.

J: A system comprising: one or more processing units to: receive training data representative of one or more images and one or more group classifications associated with the one or more images, an individual group classification of the one or more group classifications indicating a first group or a second group; update one or more parameters associated with a classifier using the training data; and based at least on the one or more parameters being updated, determine, using the classifier and based at least on image data representative of an image, that the image is associated with the first group.

K: The system of paragraph J, wherein the one or more processing units are further to, based at least on the one or more parameters being updated, determine, using the classifier and based at least on second image data representative of a second image, that the second image is associated with the second group.

L: The system of paragraph K, wherein the one or more processing units are further to: generate, based at least on the second image being associated with the second group, updated training data by adding the second image data to the training data; further update the one or more parameters associated with the classifier using the updated training data; and based at least on the one or more parameters being further updated, determine, using the classifier and based at least on the image data representative of the image, that the image is associated with the second group.

M: The system of any of paragraphs J-L, wherein the one or more parameters associated with the classifier are updated by at least: determining, using the classifier, one or more second group classifications associated with the one or more images; determining one or more differences between the one or more group classifications and the one or more second group classifications; and updating the one or more parameters associated with the classifier based at least on the one or more differences.

N: The system of any of paragraphs J-M, wherein the one or more processing units are further to: determine, using a second classifier and based at least on the image being associated with the first group, an object classification associated with the image; and store the image data representative of the image and the object classification associated with the image.

O: The system of any of paragraphs J-N, wherein the one or more parameters associated with the classifier are updated in order to cause the classifier to determine whether the image is associated with the first group or the second group.

P: The system of any of paragraphs J-O, wherein the one or more processing units are further to: generate, based at least on the image data, second image data representative of a second image, the second image including an augmented image associated with the image; determine, using a second classifier, a first object classification associated with the image and a second object classification associated with the second image; and determine whether to further analyze the image data based at least on the first object classification associated with the image and the second object classification associated with the second image.

Q: The system of paragraph P, wherein the determination of whether to further analyze the image data comprises one of: determining to use human analysis associated with the image data based at least on the first object classification associated with the image including a different object classification than the second object classification associated with the second image; or determining to refrain from using the human analysis associated with the image data based at least on the first object classification associated with the image including a same object classification as the second object classification associated with the second image.

R: The system of any of paragraphs J-Q, wherein the system is comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system implementing one or more large language models (LLMs); a system implemented using an edge device; a system implemented using a machine; a system for performing conversational AI operations; a system for generating synthetic data; a system incorporating one or more virtual machines (VMs); a system implemented at least partially in a data center; or a system implemented at least partially using cloud computing resources.

S: A processor comprising: one or more processing units to determine, using a first classifier, one or more classifications associated with one or more first images, wherein the first classifier determines the one or more classification based at least on a second classifier determining that the one or more first images are associated with a first group and one or more second images are associated with a second group.

T: The processor of paragraph S, wherein the processor is comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system implementing one or more large language models (LLMs); a system implemented using an edge device; a system implemented using a machine; a system for performing conversational AI operations; a system for generating synthetic data; a system incorporating one or more virtual machines (VMs); a system implemented at least partially in a data center; or a system implemented at least partially using cloud computing resources.

What is claimed is:

1. A method comprising:

updating, based at least on a first classifier processing training image data representative of one or more training images to determine one or more group classifications associated with the one or more training images, one or more parameters associated with the first classifier, the one or more group classifications including at least a first group classification that includes a plurality of object classifications;

after the updating of the one or more parameters associated with the first classifier, generating, by the first classifier and based at least on processing first image data representative of a first image and second image data representative of a second image, first output data representing that the first image is associated with the first group classification and the second image is associated with a second group classification;

based at least on the first image data being associated with the first group classification, generating, by a second classifier and based at least on processing the first image, second output data representing an object classification of the plurality of object classifications that is associated with the first image; and storing, in one or more databases, the first image data representative of the first image and the object classification associated with the first image.

2. The method of claim 1, wherein:

the one or more training images include a third image that is associated with the first group classification and a fourth image that is associated with the second group classification.

3. The method of claim 1, wherein the updating the one or more parameters associated with the first classifier is associated with a first training iteration, and wherein the method further comprises:

generating, based at least on the second image being associated with the second group classification, updated training image data by adding the second image data to the training image data; and further updating, during a second training iteration, the one or more parameters associated with the first classifier using at least the updated training image data.

4. The method of claim 3, wherein the determining that the first image is associated with the first group classification and the second image is associated with the second group classification occurs after the first training iteration, and wherein the method further comprises:

after the first training iteration, determining, using the first classifier and based at least on fifth image data representative of a fifth image, that the fifth image is associated with the first group classification; and after the second training iteration, determining, using the first classifier and based at least on the fifth image data representative of the fifth image, that the fifth image is associated with the second group classification.

5. The method of claim 1, wherein:

the first group classification includes the plurality of object classifications that are associated with one or more features; and the second group classification includes one or more second object classifications that are not associated with at least one of the one or more features.

6. The method of claim 1, further comprising:

determining that a key performance indicator associated with one or more machine learning models that are trained to identify one or more objects associated with the first group classification does not satisfy a threshold; and determining, based at least on the key performance indicator not satisfying the threshold, to retrieve at least the first image data associated with the first group classification.

7. The method of claim 1, further comprising:

generating, based at least on the first image data, third image data representative of a third image, the third image including an augmented image associated with the first image;

determining, using the second classifier and based at least on the third image data, a second object classification associated with the third image; and determining whether to further analyze the first image data based at least on the object classification associated with the first image and the second object classification associated with the third image.

8. The method of claim 7, wherein the determining whether to further analyze the first image data comprises one of:

determining to use human analysis associated with the first image data based at least on the object classification associated with the first image including a different object classification than the second object classification associated with the third image; or determining to refrain from using the human analysis associated with the first image data based at least on the object classification associated with the first image including a same object classification as the second object classification associated with the third image.

9. The method of claim 1, further comprising:

determining, using one or more machine learning models and based at least on video data representative of a video, that a first frame of the video depicts a first object and a second frame of the video depicts a second object;

generating, based at least on the first frame, the first image data representative of the first image, the first image depicting the first object; and generating, based at least on the second frame, the second image data representative of the second image, the second image depicting the second object.

10. A system comprising:

one or more processing units to:

receive training data representative of one or more first images and one or more group classifications associated with the one or more first images, an individual group classification of the one or more group classifications indicating a first group or a second group;

update, during a first training iteration, one or more parameters associated with a classifier using the training data;

based at least on the first training iteration being complete, determine, using the classifier and based at least on image data representative of at least a second image, that the second image is associated with the second group; and generating, based at least on the second image being associated with the second group and by at least adding the image data to the training data, updated training data for training the classifier during a second training iteration.

11. The system of claim 10, wherein the one or more processing units are further to, based at least on the first training iteration being complete, determine, using the classifier and based at least on second image data representative of a third image, that the third image is associated with the first group.

12. The system of claim 11, wherein the one or more processing units are further to:

further update, during the second training iteration, the one or more parameters associated with the classifier using the updated training data; and based at least on the second training iteration being complete, determine, using the classifier and based at least on the second image data representative of the third image, that the third image is associated with the second group.

13. The system of claim 10, wherein the one or more parameters associated with the classifier are updated by at least:

determining, using the classifier, one or more second group classifications associated with the one or more images;

determining one or more differences between the one or more group classifications and the one or more second group classifications; and updating, during the first training iteration, the one or more parameters associated with the classifier based at least on the one or more differences.

14. The system of claim 10, wherein the one or more processing units are further to:

determine, using the classifier and based at least on second image data representative of a third image, that the third image is associated with the first group;

determine, using a second classifier and based at least on the third image being associated with the first group, an object classification associated with the third image; and store the second image data representative of the third image and the object classification associated with the third image.

15. The system of claim 10, wherein the one or more parameters associated with the classifier are updated in order to cause the classifier to determine whether the second image is associated with the first group or the second group.

16. The system of claim 10, wherein the one or more processing units are further to:

determine, using the classifier and based at least on second image data representative of a third image, that the third image is associated with the first group;

generate, based at least on the second image data, third image data representative of a fourth image, the fourth image including an augmented image associated with the third image;

determine, using a second classifier, a first object classification associated with the third image and a second object classification associated with the fourth image; and determine whether to further analyze the second image data based at least on the first object classification associated with the third image and the second object classification associated with the fourth image.

17. The system of claim 10, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implementing one or more large language models (LLMs);

a system implemented using an edge device;

a system implemented using a machine;

a system for performing conversational AI operations;

a system for generating synthetic data;

a system incorporating one or more virtual machines (VMs);

a system implemented at least partially in a data center; or a system implemented at least partially using cloud computing resources.

18. The system of claim 10, wherein the one or more processing units are further to:

based at least on the first training iteration being complete, determine, using the classifier and based at least on second image data representative of a third image, that the third image is associated with the first group; and refrain, based at least on the third image being associated with the first group, from adding the second image to the training data when generating the updated training data.

19. One or more processors comprising processing circuitry to:

update, based at least on training image data representative of one or more training images and one or more group classifications associated with the one or more training images, one or more parameters associated with a first classifier, the one or more group classifications including at least a first group classification that includes a plurality of object classifications;

generate, by the first classifier and based at least on processing image data representative of images, first output data indicating that a first portion of the images is associated with the first group classification and a second portion of the images is associated with a second group classification; and generate, by a second classifier and based at least on processing a portion of the image data that represents the first portion of the images, an object classification of the plurality of object classification that is associated with at least an image of the first portion of the images.

20. The one or more processors of claim 19, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implementing one or more large language models (LLMs);

a system implemented using an edge device;

a system implemented using a machine;

a system for performing conversational AI operations;

a system for generating synthetic data;

a system incorporating one or more virtual machines (VMs);

a system implemented at least partially in a data center; or a system implemented at least partially using cloud computing resources.

\* \* \* \* \*